United States Patent [19]
Leung et al.

[11] Patent Number: 5,729,152
[45] Date of Patent: *Mar. 17, 1998

[54] TERMINATION CIRCUITS FOR REDUCED SWING SIGNAL LINES AND METHODS FOR OPERATING SAME

[75] Inventors: Wingyu Leung, Cupertino; Winston Lee, South San Francisco; Fu-Chieh Hsu, Saratoga, all of Calif.

[73] Assignee: Monolithic System Technology, Inc., Sunnyvale, Calif.

[*] Notice: The term of this patent shall not extend beyond the expiration date of Pat. No. 5,498,990.

[21] Appl. No.: 549,610

[22] Filed: Oct. 27, 1995

Related U.S. Application Data

[62] Division of Ser. No. 270,856, Jul. 5, 1994.
[51] Int. Cl.$^6$ .................................................. H03K 17/16
[52] U.S. Cl. ............................................ 326/21; 326/30
[58] Field of Search .............................. 326/21, 30, 121

[56] References Cited

U.S. PATENT DOCUMENTS

| | | |
|---|---|---|
| 3,585,378 | 6/1971 | Bouricius et al. . |
| 3,651,473 | 3/1972 | Faber . |
| 3,761,879 | 9/1973 | Brandsma et al. . |

(List continued on next page.)

FOREIGN PATENT DOCUMENTS

| | | |
|---|---|---|
| 178 949 | 4/1986 | European Pat. Off. . |
| 0 389 203 | 9/1990 | European Pat. Off. . |
| 59-212962 | 12/1984 | Japan . |
| WO-91/16680 | 10/1991 | WIPO . |
| WO-93/18459 | 9/1993 | WIPO . |
| WO-93/18462 | 9/1993 | WIPO . |
| WO-93/18463 | 9/1993 | WIPO . |

OTHER PUBLICATIONS

"Active Terminators for CMOS Drivers", IBM Tech. Discl. Bull., vol. 32, No. 4A, pp. 393–395, Sep. 1989.

Peter van Zant, *Microchip, A Practical Guide to Semiconductor Processing*, 1st Ed., Semiconductor Services, San Jose, CA 1986, p. 8.

MacDonald et al, "Dynamic RAMs 200mb Wafer Memory," IEEE ISSCC, Feb. 17, 1989, pp. 240–241 and 350.

Cavil et al., "Wafer–Scale Integration," Microelectronics Manufacturing Technology, May, 1991, pp. 55–59.

(List continued on next page.)

*Primary Examiner*—David R. Hudspeth
*Attorney, Agent, or Firm*—Skjerven, Morrill, MacPherson, Franklin & Friel; Norman R. Klivans; E. Eric Hoffman

[57] ABSTRACT

A memory device which utilizes a plurality of memory modules coupled in parallel to a master I/O module through a single directional asymmetrical signal swing (DASS) bus. This structure provides an I/O scheme having symmetrical swing around half the supply voltage, high through-put, high data bandwidth, short access time, low latency and high noise immunity. The memory device utilizes improved column access circuitry including an improved address sequencing circuit and a data amplifier within each memory module. The memory device includes a resynchronization circuit which allows the device to operate either synchronously and asynchronously using the same pins. Each memory module has independent address and command decoders to enable independent operation. Thus, each memory module is activated by commands on the DASS bus only when a memory access operation is performed within the particular memory module. The memory device includes redundant memory modules to replace defective memory modules. Replacement can be carried out through commands on the DASS bus. The memory device can be configured to simultaneously write a single input data stream to multiple memory modules or to perform high-speed interleaved read and write operations. In one embodiment, multiple memory devices are coupled to a common, high-speed I/O bus without requiring large bus drivers and complex bus receivers in the memory modules.

20 Claims, 24 Drawing Sheets

U.S. PATENT DOCUMENTS

| | | |
|---|---|---|
| 3,803,562 | 4/1974 | Hunter . |
| 3,849,872 | 11/1974 | Hubacher ............... 29/574 |
| 3,983,537 | 9/1976 | Parsons et al. . |
| 4,007,452 | 2/1977 | Hoff, Jr. ............... 340/173 |
| 4,038,648 | 7/1977 | Chesley . |
| 4,063,225 | 12/1977 | Stewart . |
| 4,071,887 | 1/1978 | Daly et al. . |
| 4,092,733 | 5/1978 | Coontz et al. . |
| 4,132,869 | 1/1979 | Knox . |
| 4,188,670 | 2/1980 | Hsia ............... 365/49 |
| 4,215,430 | 7/1980 | Johnson, Jr. . |
| 4,227,045 | 10/1980 | Chelcun et al. . |
| 4,319,356 | 3/1982 | Kocol et al. . |
| 4,329,685 | 5/1982 | Mahon et al. . |
| 4,355,387 | 10/1982 | Portejoie et al. . |
| 4,379,327 | 4/1983 | Tietjen et al. . |
| 4,400,794 | 8/1983 | Koos . |
| 4,407,014 | 9/1983 | Holtey et al. . |
| 4,414,480 | 11/1983 | Zasio ............... 326/30 |
| 4,438,352 | 3/1984 | Mardkha ............... 326/30 X |
| 4,458,297 | 7/1984 | Stopper et al. ............... 361/403 |
| 4,467,400 | 8/1984 | Stopper ............... 361/403 |
| 4,494,196 | 1/1985 | Greer . |
| 4,605,928 | 8/1986 | Georgiou . |
| 4,615,017 | 9/1986 | Finlay et al. . |
| 4,627,058 | 12/1986 | Moriyama . |
| 4,630,355 | 12/1986 | Johnson ............... 29/575 |
| 4,639,861 | 1/1987 | Appiano et al. . |
| 4,639,933 | 1/1987 | Howell et al. . |
| 4,646,298 | 2/1987 | Laws et al. . |
| 4,649,384 | 3/1987 | Sheafor et al. . |
| 4,653,050 | 3/1987 | Vaillancourt . |
| 4,663,758 | 5/1987 | Lambarelli et al. . |
| 4,667,328 | 5/1987 | Imran . |
| 4,680,780 | 7/1987 | Agoston et al. . |
| 4,703,436 | 10/1987 | Varshney . |
| 4,707,808 | 11/1987 | Heimbigner . |
| 4,719,621 | 1/1988 | May . |
| 4,736,365 | 4/1988 | Stern . |
| 4,823,363 | 4/1989 | Yoshida . |
| 4,847,615 | 7/1989 | MacDonald . |
| 4,866,508 | 9/1989 | Eichelberger et al. ............... 357/74 |
| 4,872,137 | 10/1989 | Jennings, III . |
| 4,876,700 | 10/1989 | Grindahl . |
| 4,881,232 | 11/1989 | Sako et al. . |
| 4,890,224 | 12/1989 | Fremont . |
| 4,906,987 | 3/1990 | Venaleck et al. ............... 340/825 |
| 4,912,633 | 3/1990 | Schweizer et al. . |
| 4,926,382 | 5/1990 | Sakui et al. . |
| 4,943,914 | 7/1990 | Kubo . |
| 4,943,966 | 7/1990 | Giunta et al. . |
| 4,955,020 | 9/1990 | Stone et al. . |
| 4,970,724 | 11/1990 | Yung . |
| 4,974,048 | 11/1990 | Chakravorty et al. ............... 357/40 |
| 4,980,765 | 12/1990 | Kudo et al. ............... 358/160 |
| 4,984,192 | 1/1991 | Flynn . |
| 4,985,895 | 1/1991 | Pelkey . |
| 5,001,712 | 3/1991 | Splett et al. . |
| 5,020,020 | 5/1991 | Pomfret et al. . |
| 5,021,985 | 6/1991 | Hu et al. . |
| 5,043,820 | 8/1991 | Wyles et al. . |
| 5,045,725 | 9/1991 | Sasaki et al. ............... 307/465 |
| 5,055,897 | 10/1991 | Canepa et al. ............... 357/23.5 |
| 5,077,596 | 12/1991 | Inoue ............... 357/41 |
| 5,077,737 | 12/1991 | Leger et al. . |
| 5,077,738 | 12/1991 | Larsen et al. . |
| 5,103,424 | 4/1992 | Wade . |
| 5,111,271 | 5/1992 | Hatada et al. ............... 357/45 |
| 5,111,434 | 5/1992 | Cho . |
| 5,118,975 | 6/1992 | Hillis et al. . |
| 5,128,737 | 7/1992 | van der Have ............... 357/40 |
| 5,131,015 | 7/1992 | Benjaram et al. . |
| 5,133,064 | 7/1992 | Hotta et al. . |
| 5,159,273 | 10/1992 | Wright et al. . |
| 5,161,152 | 11/1992 | Czerwiec et al. . |
| 5,187,779 | 2/1993 | Jeddeloh et al. . |
| 5,204,836 | 4/1993 | Reed . |
| 5,206,832 | 4/1993 | Yamaguchi et al. . |
| 5,214,657 | 5/1993 | Farnworth et al. . |
| 5,218,686 | 6/1993 | Thayer . |
| 5,227,677 | 7/1993 | Furman ............... 326/30 X |
| 5,243,703 | 9/1993 | Farmwald et al. ............... 395/325 |
| 5,247,522 | 9/1993 | Reiff . |
| 5,252,507 | 10/1993 | Hively et al. . |
| 5,254,883 | 10/1993 | Horowitz et al. ............... 307/443 |
| 5,261,077 | 11/1993 | Duval et al. . |
| 5,265,216 | 11/1993 | Murphy et al. . |
| 5,268,639 | 12/1993 | Gasbarro et al. ............... 324/158 |
| 5,278,967 | 1/1994 | Curran . |
| 5,311,083 | 5/1994 | Wanlass ............... 326/30 X |
| 5,329,174 | 7/1994 | Chiang . |
| 5,329,559 | 7/1994 | Wong et al. . |
| 5,371,420 | 12/1994 | Nakao ............... 326/27 |
| 5,379,258 | 1/1995 | Murakami et al. . |
| 5,402,388 | 3/1995 | Wojcicki et al. . |
| 5,434,996 | 7/1995 | Bell . |
| 5,539,328 | 7/1996 | Mirov et al. ............... 326/30 |

OTHER PUBLICATIONS

Ron Iscoff, "Characterizing Quickturn ASICs: It's Done with Mirrors" semiconductor International, Aug. 1, 1990, pp. 68–73.

Takai et al., "250 Mbyte/s Synchronous DRAM Using a 3-Stage-Pipelined Architecture," IEEE Jnl of Solid State circuirts, vol. 29, No. 4, Apr. 1994, pp. 426–431.

Fujii, et al., "A 50–μA Standby 1M×1/256K×4 CMOS DRAM with High-Speed Sense Amplifier," IEEE Jnl of Solid State Circuits, vol. SC–21, No. 5, oct., 1986, pp. 643–647.

Yamashita, Koichi and Shohei Ikehara, "A Design and Yield Evaluation Technique for Wafer–Scale Memory," IEEE Trans Jnl, Apr. 1992, pp. 19–27.

Horst, Robert W., "Task–Flow Architecture for WSI Parallel Processing," IEEE Trans Jnl, Apr. 1992, pp. 10–18.

Ganapathy et al., "Yield Optimization in Large RAM's with Hierachical Redundancy," IEEE Jnl of Solid–State Circuits, vol. 26, No. 9, Sep., 1991, pp. 1259–1269.

Aubusson, Russell C. and Ivor Catt, "Wafer–Scale Integration—A Fault–Tolerant Procedure," IEE Jnl of Solid State Circuits, vol. SC–13, No. 3, Jun., 1978, pp. 339–344.

Stodieck, Robert, "Designing With the IDT49C460 and IDT39C60 Error Detection and Correction Units," Application Note AN–24 by IDT, 1989, pp. 1–10.

Antola et al., "Reconfiguration of Binary Trees: The Flow–Driven Approach," 1991 International Conference on Wafer Scale Integration, 1991, pp. 141–147.

Shi, Weiping and W. Kent Fuchs, "Large Area Defect–Tolerant Tree Architectures," 1991 International Conference on Wafer Scale Integration, 1991, pp. 127–133.

IBM Technical Disclosure Bulletin, vol. 32, No. 4A, Oct. 1989, New York, pp. 423–425.

IBM Technical Disclosure Bulletin, vol. 32, No. 9A, Feb. 1990, New York, pp. 405–406.

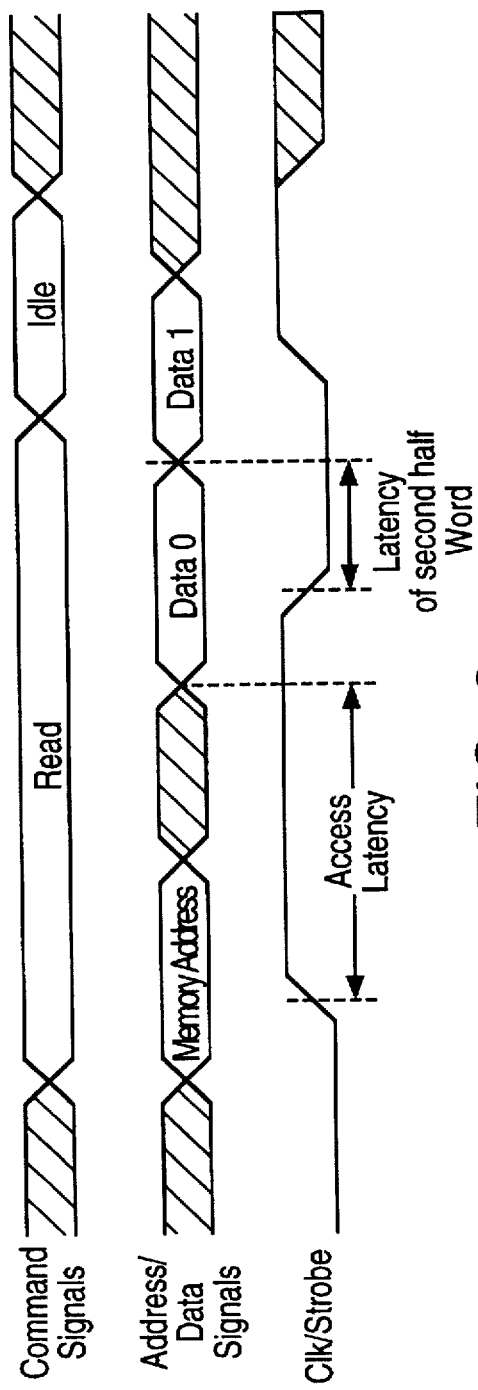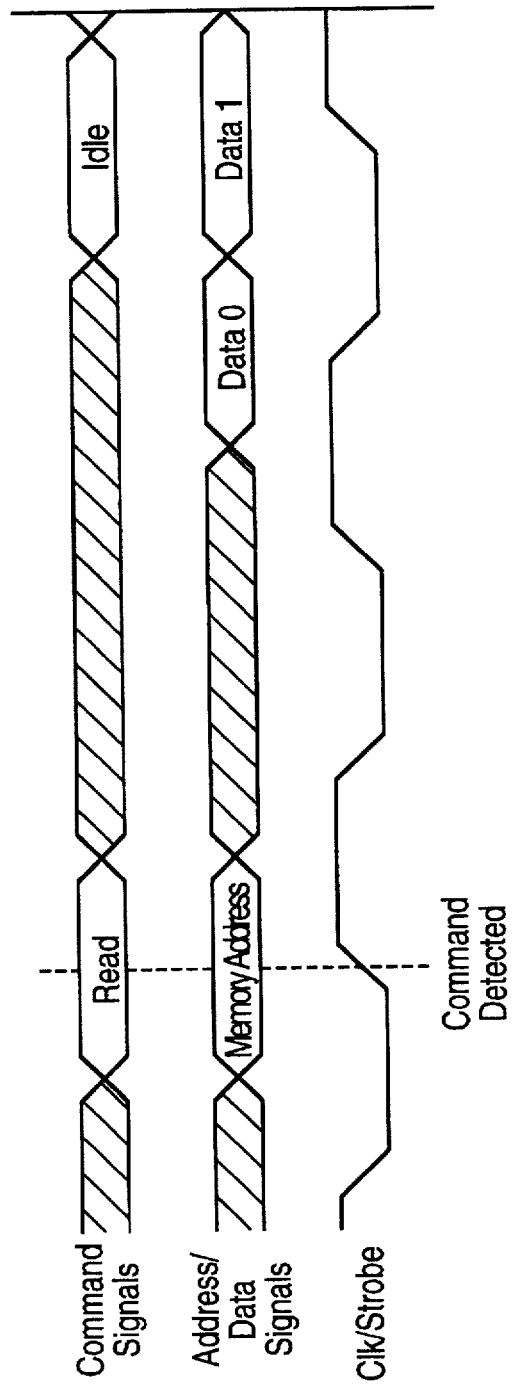

TERMINATION CIRCUITS FOR REDUCED SWING SIGNAL LINES AND METHODS FOR OPERATING SAME

This application is a division of application Ser. No. 08/270,856, filed Jul. 5, 1994 pending.

BACKGROUND OF THE INVENTION

1. Field of the Invention

The present invention relates to a data processing system having a few bus masters and many bus slaves connected in parallel to a common bus. In particular, this invention relates low latency, high bandwidth, low power, high-yield, large capacity memory devices suitable for data processing and video systems. This invention is particularly suitable for systems organized into multiple identical modules in a very-large-scale or wafer-scale integration environment.

2. Description of the Prior Art

When transmitting signals on traditional bus systems, problems typically arise when either of the following conditions exist: (i) the rise or fall time of the transmitted signal is a significant fraction of the bus clock period or (ii) there are reflections on the bus of the signal which interfere with the rising or falling transitions of the signal. The data transfer rate is limited in part by whether signal integrity is compromised as a result of the above conditions. Therefore, to increase data bandwidth, it is desirable to avoid the above-listed conditions.

High frequency data transmission through a bus requires a high rate of electrical charge (Q) transfer on and off the bus to achieve adequate rise and fall times. To avoid condition (i) above, large transistors in the bus drivers are needed to source and sink the large amounts of current required to switch the signal levels. Equation (1) sets forth the relationship between the required current drive capability (I) of the bus drivers, the number of devices (n) attached to the bus, the output capacitance (C) of the bus driver, the signal swing (V) needed to distinguish between logical 1 and 0, and the maximum operating frequency (f) of the bus.

$$I = nCVf \qquad \text{Eq(1)}$$

Thus, one way to obtain a higher operating frequency is to increase the drive capability of the bus driver. However, higher drive usually requires a driver with larger size, which in turn translates to increased silicon area, bus capacitance, power consumption and power supply noise. Furthermore, when the output capacitance of the bus driver becomes a substantial part of the bus capacitance, increasing the size of the bus driver does not result in a higher operating frequency.

Another way to increase the operating frequency is to reduce the signal swing on the bus. Signal swing is defined as the difference between the maximum voltage and the minimum voltage of the signals transmitted on the bus. Many traditional bus systems, including the TTL standard, use reduced-swing signal transmission (i.e., signal swing smaller than the supply voltage), to enable high speed operations. A reduced signal swing reduces the required charge transfer, thereby reducing power consumption, noise and required silicon area. Because reduced signal swing substantially reduces the current required from the bus driver, parallel termination of bus lines is facilitated. Parallel termination is an effective way to suppress ringing in the bus. However, the use of small swing signals requires the use of sophisticated amplifiers to receive the signals. As the signal swing decreases, the required gain of the amplifier increases, thereby increasing the required silicon area and operating power. It would therefore be desirable to have a bus system which utilizes small swing signals, but does not require the use of sophisticated amplifiers.

Prior art small swing (less than 1.5 V peak-to-peak) I/O (input/output) schemes generally have a logic threshold voltage different from $V_{dd}/2$ (i.e., one-half of the supply voltage), the logic threshold of a conventional CMOS logic circuit. The logic threshold, or trip point, of a bus signal is the voltage level which delineates a logical 1 from a logical 0. An example of such scheme is GTL, where a logic threshold of 0.8 volt is used. (R. Foss et al, IEEE Spectrum Oct. 1992, p.54–57, "Fast interfaces for DRAMs"). Other small swing I/O schemes, such as center-tap terminated (CTT) interface (JEDEC Standard, JESD8-4, Nov., 1993), have a fixed threshold (e.g., 1.5 volts) which does not track with the supply voltage. To use a bus signal having logic threshold other than the CMOS logic threshold in a CMOS integrated circuit, a translator circuit must be used to translate the I/O logic threshold to the conventional CMOS logic threshold. These translators consume circuit real estate and power, introduce additional circuit delay and increase circuit complexity.

CMOS circuitry uses a logic threshold of $V_{dd}/2$ to permit the CMOS circuitry to operate with symmetrical noise margins with respect to the power and ground supply voltages. This logic threshold also results in symmetrical inverter output rise and fall times as the pull-up and pull-down drive capabilities are set to be approximately equal.

Traditional DRAM devices (IC's) are organized into arrays having relatively small capacities. For example, most commercial 1M bit and 4M bit DRAM devices have an array size of 256K bit. This organization is dictated by the bit-line sense voltage and word line (RAS) access time. However, all arrays inside a DRAM device share a common address decoding circuit. The arrays in DRAM devices are not organized as memory modules connected in parallel to a common bus. Furthermore, each memory access requires the activation of a substantial number (e.g., one quarter to one half) of the total number of arrays, even though most of the activated arrays are not accessed. As a result, power is wasted and the soft-error rate due to supply noise is increased.

Prior art DRAM schemes, such as Synchronous DRAM (JEDEC Standard, Configurations For Solid State Memories, No. 21-C, Release 4, Nov. 1993) and Rambus DRAM (See, PCT Patent document PCT/US91/02590) have attempted to organize the memory devices into banks. In the synchronous DRAM scheme, the JEDEC Standard allows only one bit for each bank address, thereby implying that only two banks are allowed per memory device. If traditional DRAM constraints on the design are assumed, the banks are formed by multiple memory arrays. The Rambus DRAM scheme has a two bank organization in which each bank is formed by multiple memory arrays. In both schemes, due to the large size of the banks, bank-level redundancy is not possible. Furthermore, power dissipation in devices built with either scheme is at best equal to traditional DRAM devices. Additionally, because of the previously defined limitations, neither the Synchronous DRAM scheme nor the Rambus DRAM scheme uses a modular bank architecture in which the banks are connected in parallel to a common internal bus.

Many prior art memory systems use circuit-module architecture in which the memory arrays are organized into modules and the modules are connected together with either serial buses or dedicated lines. (See, PCT patent document PCT/GB86/00401, M. Brent, "Control System For Chained Circuit Modules" [serial buses]; and "K. Yamashita, S. Ikehara, M. Nagashima, and T. Tatematsu, "Evaluation of Defect-Tolerance Scheme in a 600 M-bit Wafer-Scale Memory", Proceedings on International Conference on Wafer Scale Integration, Jan. 1991, pp. 12–18. [dedicated lines]). In neither case are the circuit modules connected in parallel to a common bus.

Prior art memory devices having a high I/O data bandwidth typically use several memory arrays simultaneously to handle the high bandwidth requirement. This is because the individual memory arrays in these devices have a much lower bandwidth capability than the I/O requirement. Examples of such prior art schemes include those described by K. Dosaka et al, "A 100-MHz 4-Mb Cache DRAM with Fast Copy-Back Scheme", *IEEE Journal of Solid-State Circuits*, Vol. 27, No. 11, Nov. 1992, pp. 1534–1539; and M. Farmwald et al, PCT Patent document PCT/US91/02590.

Traditional memory devices can operate either synchronously or asynchronously, but not both. Synchronous memories are usually used in systems requiring a high data rate. To meet the high data rate requirement, synchronous memory devices are usually heavily pipelined. (See, e.g., the scheme described in "250 Mbyte/s Synchronous DRAM Using a 3-Stage-Pipelined Architecture", Y. Takai et al, IEEE JSSC, vol. 29, no. 4, April, 1994, pp. 426–431.) The pipelined architecture disclosed in Y. Takai et al, causes the access latency to be fixed at 3 clock cycles at all clock frequencies, thereby making this synchronous memory device unsuitable for systems using lower clock frequencies. For example, when operating at 50 Mhz the device has an access latency of 60 ns (compared to an access latency of 24 ns when operating at 125 Mhz).

Conventional asynchronous memory devices, due to the lack of a pipeline register, maintain a fixed access latency at all operating frequencies. However, the access cycle time can seldom be substantially smaller than the access latency. Consequently, asynchronous devices are unsuitable for high data rate applications.

Thus, it would be desirable to have a memory device which provides a high through-put, low latency, high noise immunity, I/O scheme which has a symmetrical swing around one half of the supply voltage.

It would also be desirable to have a memory device which can be accessed both synchronously and asynchronously using the same set of connection pins.

Moreover, it would be desirable to have a memory device which provides a high data bandwidth and a short access time.

It would also be desirable to have a memory device which is organized into small memory arrays, wherein only one array is activated for each normal memory access, whereby the memory device has low power dissipation.

Additionally, it would be desirable to have a memory device having small functionally independent modules, a defective module can be disabled and another module is used to replace the defective module, resulting in a memory device having a high defect tolerance.

It would also be desirable to have a memory device in which a single input data stream can be simultaneously written to multiple memory arrays and in which data streams from multiple memory arrays can be multiplexed to form a single output data stream.

Furthermore, it would be desirable to have a memory device in which many memory modules are attached to a high-speed common bus without the necessity of large bus drivers and complex bus receivers in the modules.

SUMMARY OF THE INVENTION

The present invention implements a compact, high speed reduced CMOS swing I/O scheme which uses $V_{dd}/2$ as the logic threshold. This scheme has the following advantages: (i) The logic threshold tracks with supply voltages, thereby maintaining balance of pull-up and pull-down. (ii) The bus driver and receiver circuits work at a very wide range of supply voltages without sacrificing noise immunity, since the thresholds of the bus driver and receiver circuits track with each other automatically. (iii) The logic threshold is implicit in the logic circuit and does not require an explicit reference generator circuit. (iv) Logic threshold translation is not necessary since the I/O logic threshold is identical to that of the other logic circuitry on-chip.

The present invention groups at least two memory arrays or banks into a memory module and connects all the memory modules in parallel to a common high-speed, directional asymmetrical signal swing (DASS) bus, thereby forming a memory device. The memory modules transmit signals having a reduced swing to a master module coupled to the DASS bus. In one embodiment, this reduced swing is equal to approximately one volt about a center voltage of $V_{dd}/2$, where $V_{dd}/2$ is the threshold voltage of CMOS circuitry. The signal transmitted from the master device to the memory modules has a full $V_{dd}$ swing.

The memory modules are equipped with independent address and command decoders so that they function as independent units, each with their own base address. This circuit-module architecture has several advantages: (i) it allows each memory module to be able to replace any other memory module thereby increasing the defect tolerance of the memory device. (ii) It significantly reduces power consumption of the memory device when compared to traditional memory devices because each memory access is handled completely by one memory module only with only one of the arrays activated. (iii) Since each memory module is a complete functional unit, the memory module architectures allows parallel accesses and multiple memory module operations to be performed within different memory modules, thereby increasing the performance of the memory device. (iv) The memory module architecture allows the memory device to handle multiple memory accesses at the same time.

The circuit-module architecture of the present invention further allows easy system expansion by connecting multiple memory devices in parallel through a common I/O bus which is an extension of the on chip bus. In addition, by incorporating redundant memory modules on each memory device and allowing each memory module to have a programmable communication address on the I/O bus system, the resulting memory system has defect tolerance capability which is better than each individual memory device.

In one embodiment of the present invention, the memory arrays include redundant rows and columns. Circuitry is provided within the memory modules to support the testing of these and redundant rows and columns. Circuitry is also provided to replace defective rows and columns with the redundant rows and columns during operation of the memory device.

The memory devices in accordance with the present invention are able to span address spaces which are not contiguous by controlling the communication addresses of the memory modules. Furthermore, the address space spanned by the memory devices can be dynamically modified both in location and size. This is made possible by the incorporation, in each memory module, of a programmable identification (ID) register which contains the base address of the memory module and a mechanism which decommissions the module from acting on certain memory access commands from the bus. The present invention therefore provides for a memory device with dynamically reconfigurable address space. Dynamically reconfigurable address space is especially useful in virtual memory systems in which a very large logical address space is provided to user programs and the logical address occupied by the programs are dynamically mapped to a much smaller physical memory space during program execution.

Each memory array in the present design is equipped with its own row and column address decoders and a special address sequencer which automatically increments address of the column to be accessed. Each memory array has data amplifiers which amplify the signals read from the memory array before the signals are transmitted to the lines of the DASS bus. Both the address sequencer and data amplifiers increase the signal bandwidth of the memory array. Consequently, each memory array is capable of handling the I/O data bandwidth requirement by itself. This capability makes multiple bank operations such as broadcast-write and interleaved-access possible. For example, a memory device in accordance with the present invention is able to handle a broadcast-write bandwidth of over 36 gigabytes per second and 36 memory operations simultaneously.

Memory devices in accordance with the present invention can be accessed both synchronously and asynchronously using the same set of connection pins. This is achieved using the following techniques: (i) using a self-timed control in connection with the previously described circuit-module architecture. (ii) connecting memory modules in parallel to an on-chip bus which uses source synchronous clocking. (iii) using half clock-cycle (single clock-transition) command protocol. (iv) using an on-chip resynchronization technique. This results in memory devices that have short access latency (about 10 ns), and high data bandwidth (1 gigabyte/sec).

Another embodiment of the present invention provides for the termination of bus lines. In one embodiment, a passive clamp for a bus line is created by connecting a first resistor between the bus line and a first supply voltage and connecting a second resistor between the bus line and a second supply voltage. In one embodiment, the first supply voltage is $V_{dd}$, the second supply voltage is ground, and the first and second resistor have the same resistance.

In an alternate embodiment, an active clamp for a bus line is created by connecting a p-channel transistor between the bus line and a first supply voltage and connecting an n-channel transistor between the bus line and a second supply voltage. The gates of the p-channel and n-channel transistors are driven in response to the bus line.

The present invention will be more fully understood in view of the following drawings taken together with the detailed description.

BRIEF DESCRIPTION OF THE DRAWINGS

FIG. 2a is a waveform diagram illustrating timing waveforms for asynchronous operations;

FIG. 2b is a waveform diagram illustrating timing waveforms for synchronous operations;

FIG. 3b is a schematic diagram illustrating details of one of the bus transceivers shown in FIG. 3a;

FIG. 11b is a block diagram of one embodiment of the barrel shifter of FIG. 11a;

FIG. 14b is a schematic diagram of a latch used in the latency counter of FIG. 14a;

DETAILED DESCRIPTION OF THE INVENTION

Conventional bus systems make no distinction in signal amplitude (swing) with respect to the direction of signal transfer across the bus. The signal swing transmitted from one end of the bus is identical to that of a signal sent from the other direction. In a bus system where there are substantially more slaves than masters, bus capacitance is dominated by the bus drivers of communicating devices. This is especially true in a semiconductor (integrated circuit) environment where the bus and the communicating devices are on the same chip.

Communication from masters to slaves is predominantly one-to-many (broadcast), and communication from slaves to masters is one-to-one (dedicated). Using a small bus swing when slaves communicate to the masters allows the bus driver of the slave device to be small. Reducing the slave bus driver size effectively reduces the bus capacitance, thereby facilitating low power, high speed operation. The cost of incorporating amplifiers in the bus receivers of the masters is relatively small because the number of masters is small. Using a large signal swing when masters communicate to the slaves avoids the high cost of amplifier circuits in the receivers of the slaves. Since the number of masters is small, using relatively large bus drivers in the masters does not increase the bus capacitance substantially and thus has little effect on the bus operating frequency.

DASS bus structure and protocol

Figure 1:
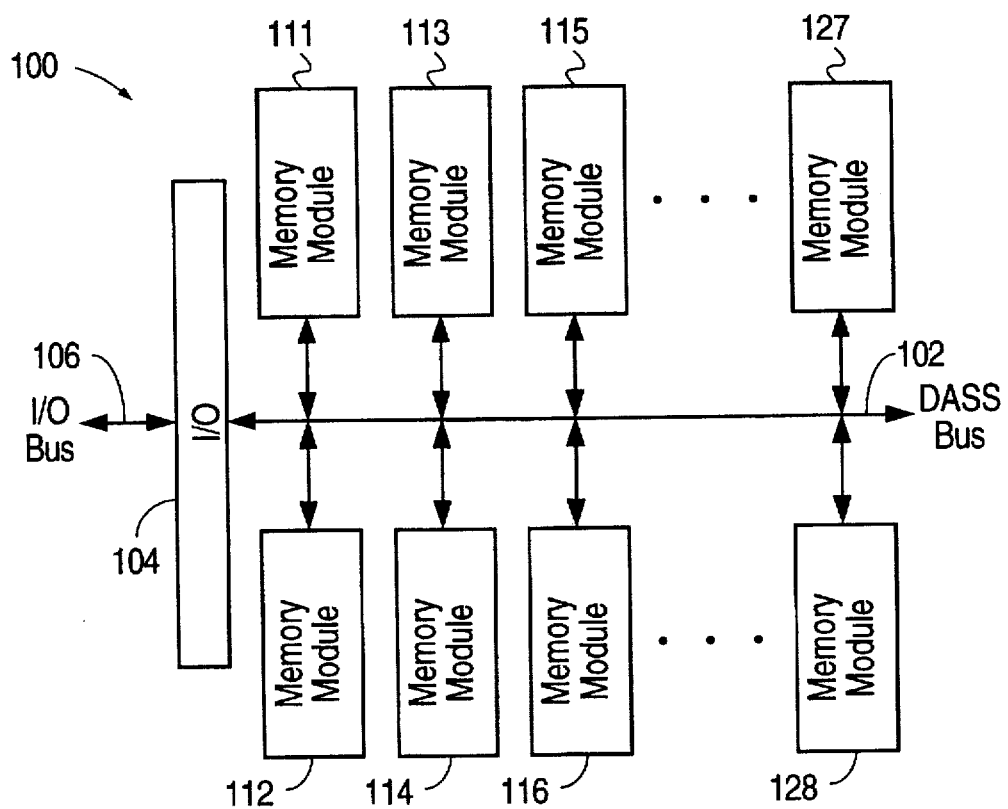
FIG. 1 is a block diagram of a memory device with a circuit-module architecture organized around a DASS bus.

FIG. 1 is a block diagram of a memory device 100 which utilizes a directional asymmetric swing system (DASS) bus 102 to couple master I/O module 104 and slave memory modules 111–128 in parallel. Although the present invention is described in connection with an embodiment having eighteen slave memory modules, it is understood that other numbers of modules can be used. Master I/O module 104 has one side connected to DASS (directional asymmetric swing system) bus 102 and another side connected to I/O bus 106. Slave memory modules 111–128 contain arrays of dynamic random access memory (DRAM).

In one embodiment, DASS bus 102 has 16 bi-directional lines ADQ[15:0] for multiplexed address, data and control information, 4 lines C[3:0] for control information, 2 lines Dm[1:0] for write-mask information, 1 line for source clock (Sck) information and 1 line for destination clock (Dck) information. When referring to memory modules 111–128, the signals on lines C[3:0], Dm[1:0], and Sck are inputs and the signal on line Dck is an output. No explicit memory module select signal is used. Memory module select information is implicit in the memory address used to access memory modules 111–128.

All memory transactions are initiated by either I/O module 104 or by devices connected to I/O bus 106. In the former case, I/O module 104 contains a memory controller. In the later case, I/O module 104 acts as a repeater between I/O bus 106 and DASS bus 102. A memory transaction is initiated with a command. A typical command requires 20 bits of information carried on C[3:0] and ADQ[15:0]. Four bits are used to encode the operation to be performed, and depending on the contents of the four command bits, the remaining sixteen bits can be a combination of the following: base (memory module) address, bank address, row address, column address, command-code extension or control register data. Each command issued is referenced to a particular transition of the clock, in this case, a low-to-high transition. Data is grouped as half-words of 16 bits each. The DASS bus is capable of transferring one half-word at each clock transition (high-to-low or low-to-high), facilitating dual-edge transfer. Essentially, this allows a 32-bit word to be transferred in one clock cycle using a 16-bit data bus.

The command protocol accommodates both synchronous and asynchronous bus operations and minimizes both the transfer overhead and the memory access latency. This is accomplished by sending the full operation code and address in half of a clock cycle (minimum time unit on the bus). This minimizes the overhead of command transfer and allows the access latency to be very close to the inherent latency of the memory. If the command takes multiple half clock-cycles, the overhead also translates into access latency as most of the command information has to be received before one of memory modules 111–128 can start the operation. For asynchronous operations, the clock signal functions as a command and data strobe. FIGS. 2a and 2b illustrate the timing of asynchronous and synchronous read operations, respectively. In either case, the command signal is strobed and evaluated on every rising edge of the clk/strobe signal.

During an asynchronous operation (FIG. 2a), the falling edge of the clk/strobe signal does not occur until the access latency of the memory has expired. When the falling edge of the clk/strobe signal occurs, the first half-word is read. After the latency associated with accessing the second half-word has expired, the clk/strobe signal transitions from low to high, thereby reading the second half-word. The latency for the second half-word is shorter than the latency for the first half-word because the address of the second half-word is generated internal to the chip. In the foregoing manner, the memory device is operated in a dual-edge transfer mode.

During synchronous operation (FIG. 2b), the first half-word signal is read during the second falling edge of the clk/strobe signal after the command signal is detected. The memory device is again operated in a dual-edge transfer mode, with the second half-word output occurring during the subsequent rising edge of the clk/strobe signal. Again, the latency for the second half-word is shorter than the latency for the first half-word. More details on the memory operations are discussed below.

Limiting bus commands to one half clock cycle seems to limit the memory address range to 64K. However, by taking advantage of the inherent characteristics of DRAM access, and separating the access into two micro-operations, the whole address does not need to be presented at the same time. The memory access operation will be discussed in detail in the memory-operation section.

DASS Bus drivers and receivers

Figure 3A:
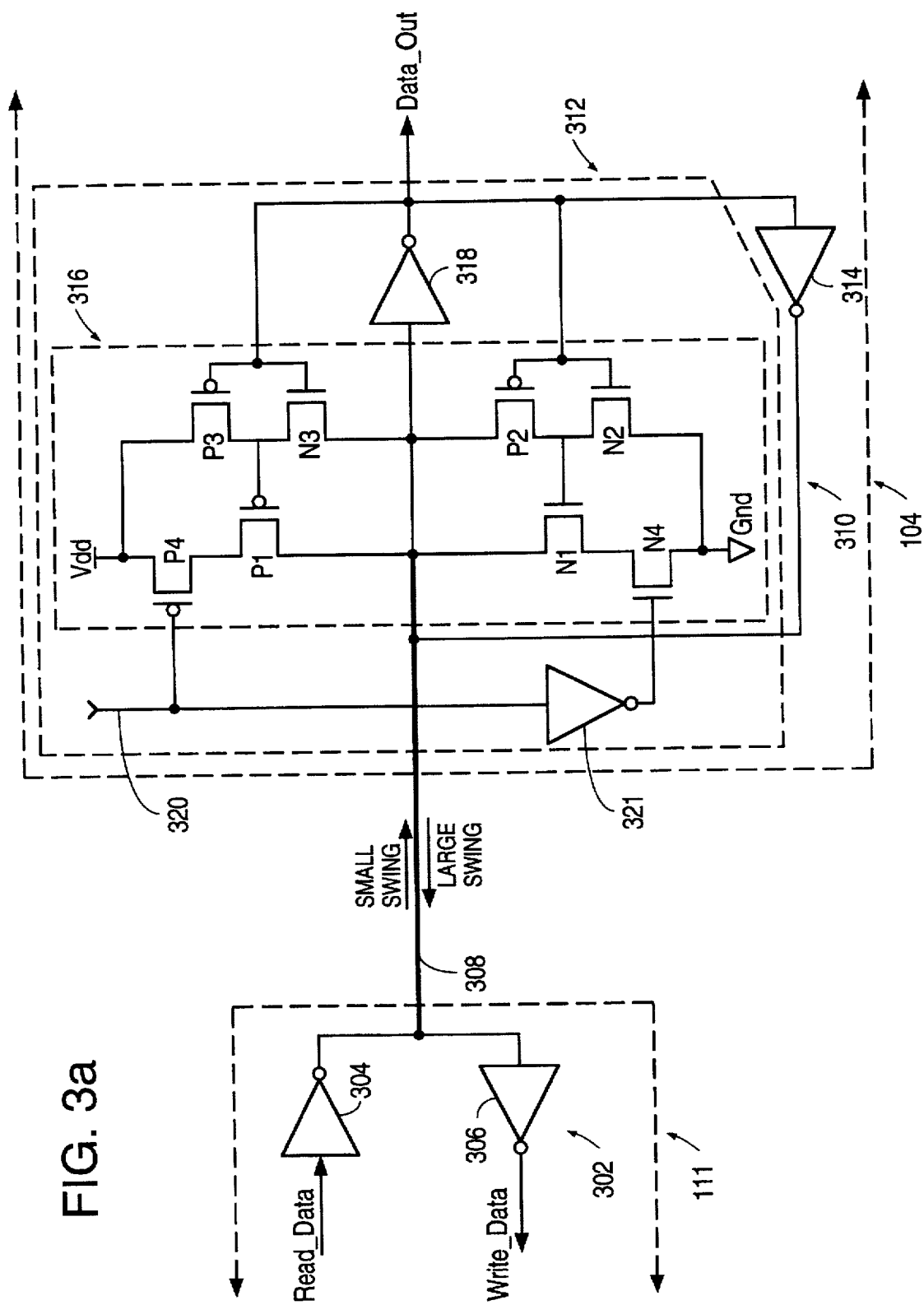
FIG. 3a is a schematic diagram of DASS bus transceivers.
Figure 3B:
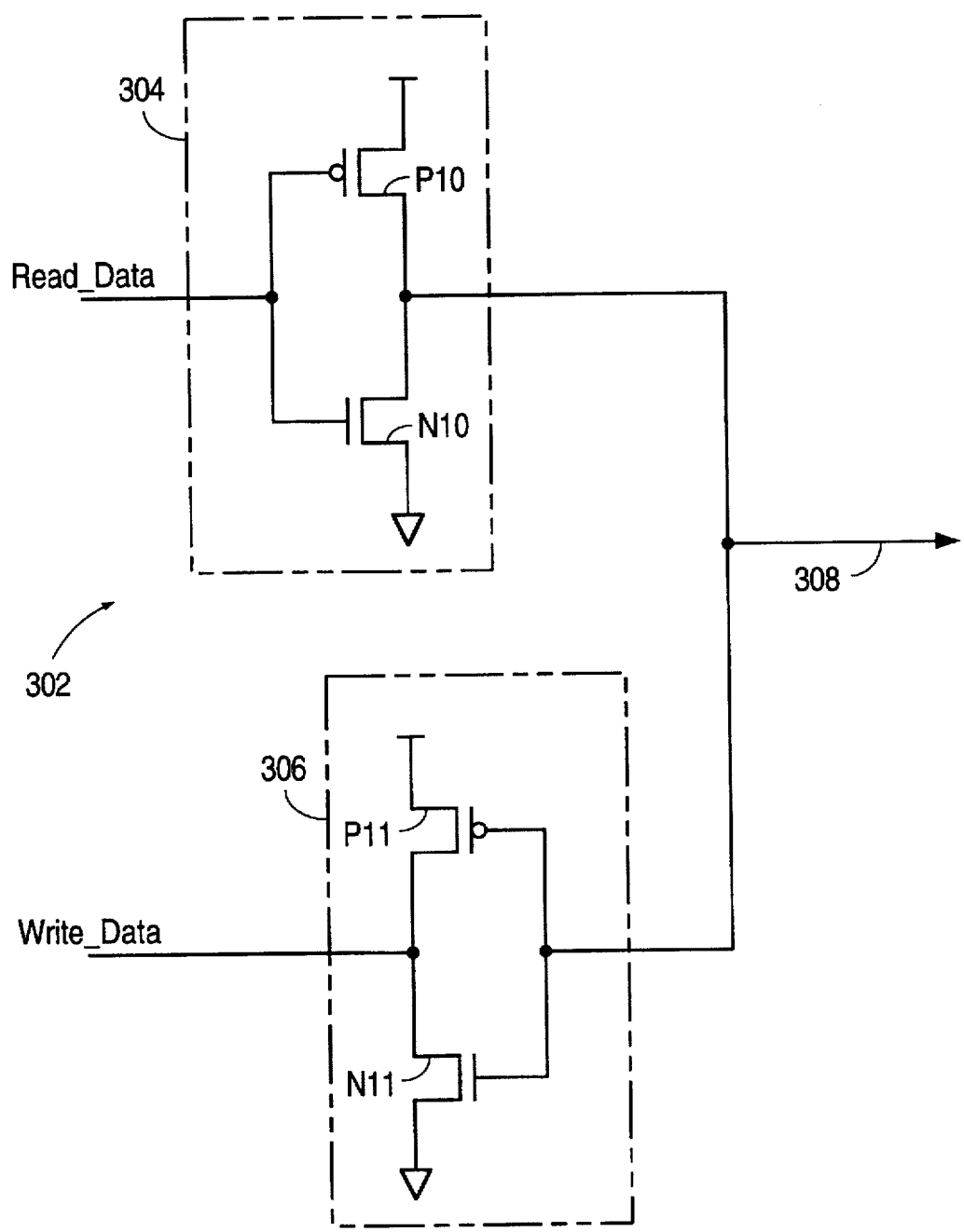

FIG. 3a is a schematic diagram illustrating bus transceiver 302 of slave memory module 111 and bus transceiver 310 of master I/O module 104. FIG. 3b is a schematic diagram of bus transceiver 302 of memory module 111. Bus transceiver 302 includes a bus driver 304 and a bus receiver 306. Bus driver 304 is a conventional CMOS inverter with a PMOS transistor P10 for pull-up and an NMOS transistor N10 for pull-down. Similarly, bus receiver 306 is a conventional CMOS inverter with a PMOS transistor P11 for pull-up and an NMOS transistor N11 for pull-down.

Bus line 308 of DASS bus 102 connects bus transceiver 302 with bus transceiver 310 in I/O module 104. Transceiver 310 includes bus receiver 312, bus driver 314, and clamping circuit 316. Clamping circuit 316 limits the signal swing on bus line 308. Bus receiver 312 includes CMOS inverter 318 and bus driver 314 includes CMOS inverter 314. Clamping circuit 316 includes n-channel field effect transistors N1–N4, p-channel field effect transistors P1–P4 and inverter 321.

Inverter 318 together with clamping circuit 316 form a single stage feedback amplifier which amplifies the signal on bus line 308. The output of inverter 318 has a swing of approximately 0.5 to $V_{dd}$–0.5 volt and is used to drive other on-chip CMOS logic.

The operation of DASS bus 102 is dependent upon the bus transceivers 302 and 310. Bus transceivers 302 and 310 dictate operating speed, power dissipation and, to a large extent, the total die area. In accordance with one embodiment of the present invention, I/O module 104 drives DASS bus 102 with a full $V_{dd}$ (supply voltage) swing. Memory modules 111–128 drive DASS bus 102 with a reduced CMOS swing of approximately 1 Volt centered around $V_{dd}/2$.

Bus receiver 312 operates in the following manner. When I/O module 104 is receiving and memory module 111 is driving, a logic low signal is provided to clamp circuit 316 on lead 320. As a result, transistors P4 and N4 are turned on and clamp circuit 316 is enabled. When the Read_data voltage at the input of inverter 304 is at ground, the output of inverter 318 is at a voltage close to ground, transistor P3 is on, transistor N3 is off, transistor P2 is on, transistor N2 is off, transistor N1 is on, and transistor P1 is off. Transistors N1 and N4 provide a conducting path from bus line 308 to ground, thereby preventing the signal on bus line 308 from going to $V_{dd}$ and clamping the voltage on bus line 308 at a voltage of approximately $V_{dd}/2+0.5$ Volt.

When the Read_data voltage at the input of inverter 304 switches from ground to $V_{dd}$, transistor P10 (FIG. 3b) turns off and transistor N10 turns on, thereby pulling bus line 308 towards ground. Transistor N1, still being on, accelerates the pull down on bus line 308 until the logic threshold of inverter 318 is reached. At this time, the output of inverter 318 switches to high, turning transistors N2 and N3 on. In turn, transistor N2 turns off transistor N1 and transistor N3 turns on transistor P1. Transistors P1 and P4 provide a conducting path between bus line 308 and $V_{dd}$, thereby clamping the signal on bus line 308 at approximately $V_{dd}/2-0.5$ volt.

As the voltage on bus line 308 swings from one logic level to another, clamping does not switch direction until the output of amplifier 318 finishes the logic transition. Clamping circuit 316, before it switches, accelerates the switching of inverter 318. The voltage swing on bus line 308 can be adjusted by changing the size of clamping transistors N1, P1, N4 and P4 or the driver transistors N10 and P10.

When I/O module 104 is driving and the memory module 111 is receiving, a logic high signal is applied to lead 320. Consequently, transistors P4 and N4 are opened and clamp circuit 316 is disabled. Transistors P4 and N4 have channel widths (sizes) two times larger than the channel widths of transistors P1 and N1, respectively. When the signal on line 320 is de-asserted, DC current in clamp circuit 316 and inverter 318 is eliminated. As a result, signals transmitted from bus driver 314 to bus receiver 306 on bus line 308 have a full $V_{dd}$ swing.

Memory module organization

Figure 4:
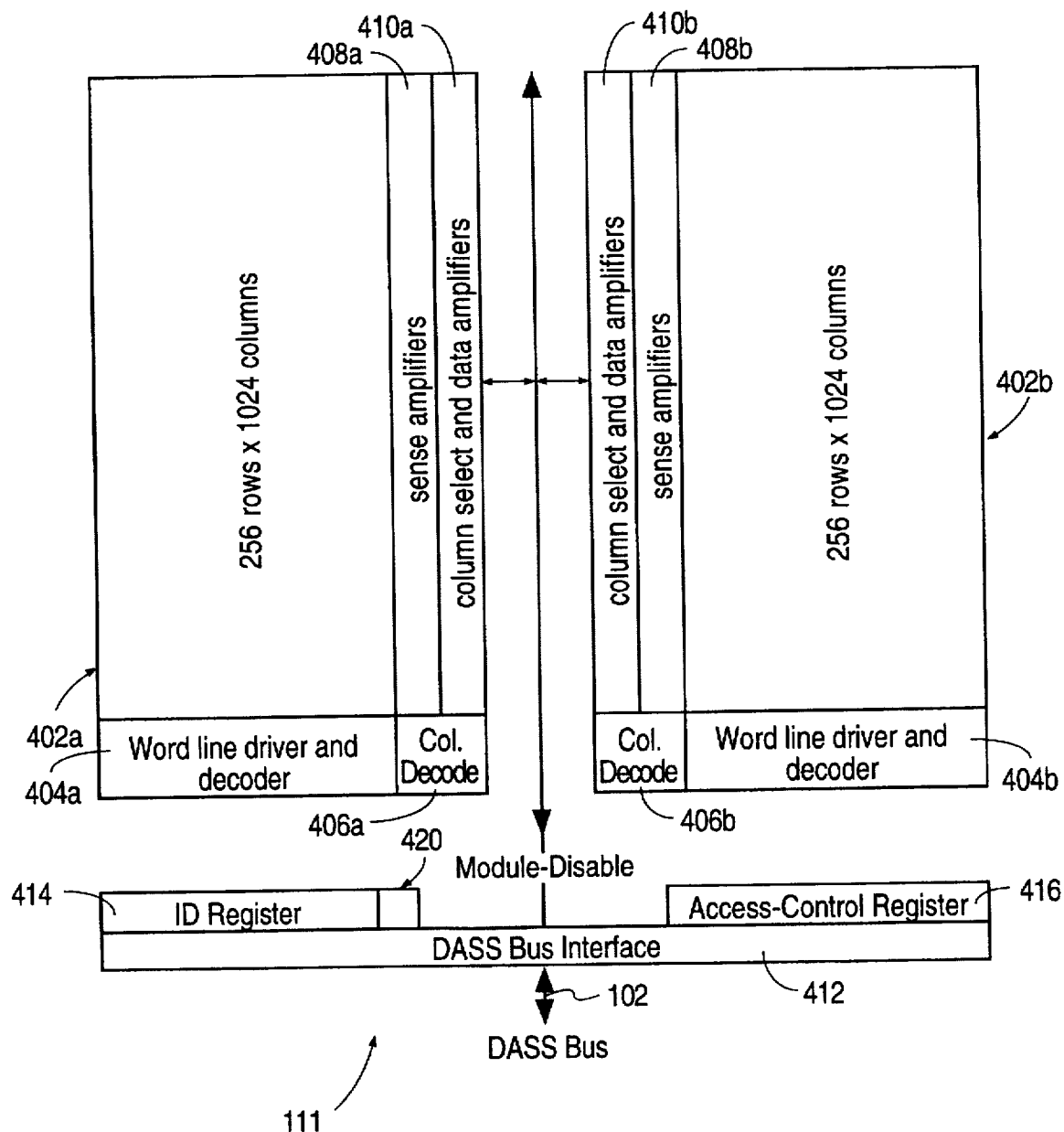
FIG. 4 is a block diagram of a memory module in accordance with the present invention.

The organization of memory module 111 in accordance with one embodiment of the present invention is illustrated in FIG. 4. In this embodiment, memory modules 112–128 are identical to memory module 111. Memory module 111 contains two memory arrays 402a and 402b, each having 256K bits organized as 256 rows and 1024 columns. Memory array 402a includes word line driver and decoder 404a, column decoder 406a, sense amplifier circuitry 408a, and column select and data amplifier circuitry 410a. Similarly, memory array 402b includes word line driver and decoder 404b, column decoder 406b, sense amplifier circuitry 408b, and column select and data amplifier circuitry 410b.

Memory arrays 402a and 402b share a common DASS memory bus interface 412 which connects memory module 111 to DASS bus 102. Bus interface 412 contains command decoding logic, timing control circuitry, address advancing circuitry, and bus drivers and receivers. Bus interface 412 also contains two programmable registers, an identification (ID) register 414 which stores the communication address of memory module 111, and an access-control register 416. ID register 414 includes a module disable bit 420 which can be programmed by a command from DASS bus 102. As described later, module disable bit 420 is dedicated for addressing redundant modules inside the memory device.

Address Mapping

Each memory module 111–128 incorporates a programmable ID register (e.g., ID register 414) which contains the communication address of the respective module. A pre-programmed communication address is assigned to each of memory modules 111–128. The communication address of each memory module 111–128 can be changed during system operation by a command from DASS bus 102. Specifically, an ID write command is transmitted on DASS bus 102 to write the new communication address to the desired ID register.

The complete address to any memory location in any of memory modules 111–128 contains 4 fields. A first field contains a base address which identifies the memory module by communication address. A second field contains an address which identifies the memory array within the memory module. Third and fourth fields contain the addresses which identify the desired row and column, respectively. The outputs of memory modules 111–128 are organized in 32-bit words.

The programmable base address provides memory modules 111–128 with dynamic address mapping capability by allowing the communication addresses of memory modules 111–128 to be modified during operation of the memory device.

In a system that contains 128 modules of 8K words, if the communication addresses of the memory modules are consecutively assigned, a 4M byte contiguous memory is formed in which seven address bits can be used to address the modules. In another application, a digital system may have distinct address spaces for a CPU (central processing unit) and for a display processor. The two processors can reside on the same bus using the same memory subsystem with some of the memory modules mapped to the CPU address space and the others mapped to the display processor address space.

Redundancy

In accordance with one embodiment of the present invention, two levels of redundancy are employed in a memory device using the circuit-module architecture described above. The first level of redundancy is memory module redundancy. Thus, in one embodiment, memory module 111 may be used as a redundant memory module. In other embodiments, an additional memory module, identical to memory modules 111–128, is coupled to DASS bus 102 and used as a redundant memory module. The redundant memory module is included to allow replacement of any defective regular module.

In an embodiment which uses memory module 111 as a redundant module, module disable bit 420 (FIG. 4) of module 111 is pre-programmed such that during normal operation of memory device 100, module 111 is disabled from participating in any memory accesses. However, ID register 414 is still accessible through the bus interface 412. The module disable bits of modules 112–128 are programmed such that these modules are enabled.

If one of the memory modules 112–128 fails during operation of memory device 100, the defective module is decommissioned by programming the disable bit of its ID register. The redundant module 111 is activated by reprogramming module disable bit 420 and writing the communication address of the defective module to ID register 414.

The second level of redundancy is row and column redundancy. Redundant rows and columns are added to each of memory arrays 111–128 for replacement of defective rows and columns in memory arrays 111–128.

Figure 5A:
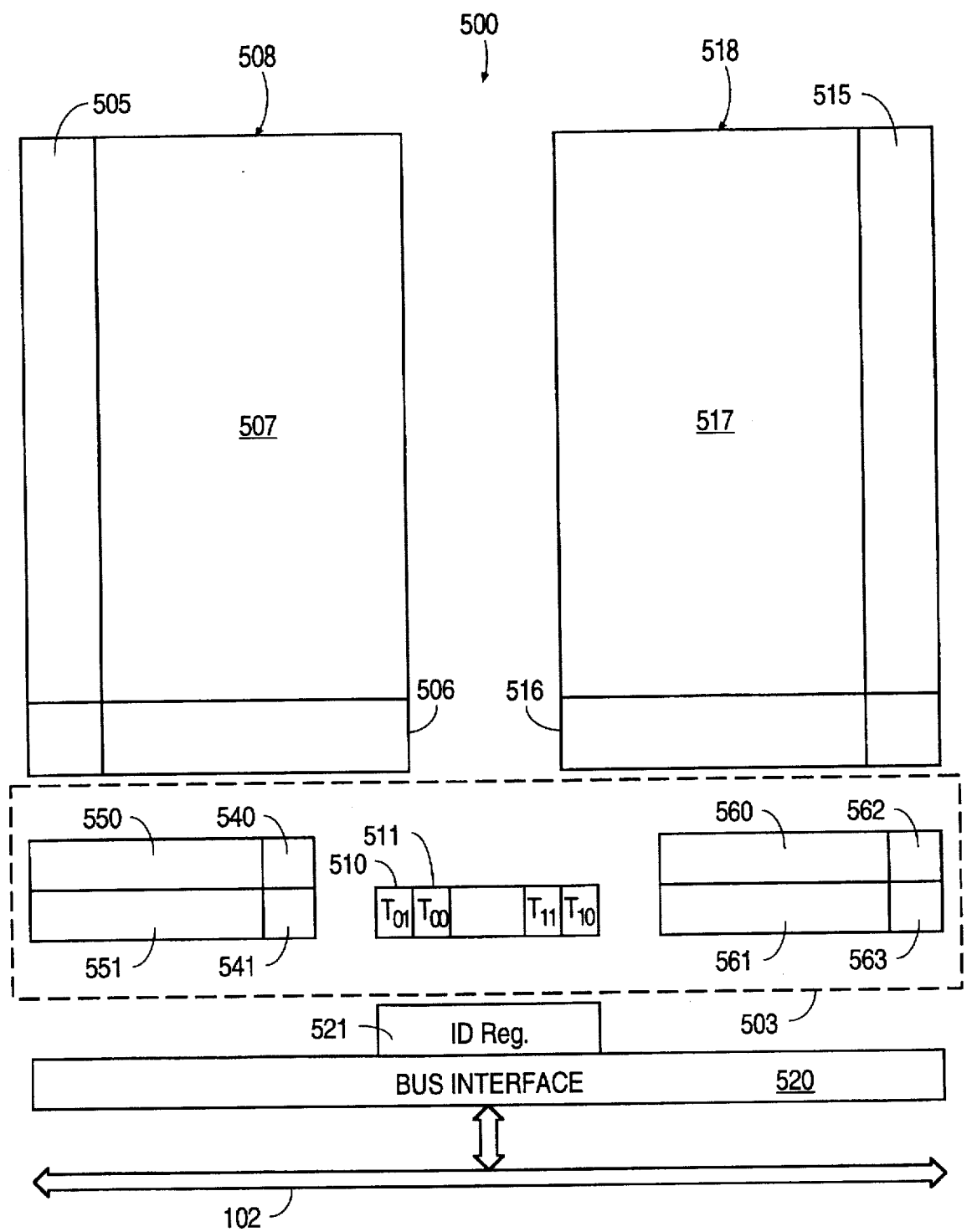
FIG. 5a is a block diagram of a memory array containing redundant rows and columns.

FIG. 5a is a block diagram of a memory module 500 having redundant memory sub-arrays 505, 506, 515 and 516. Memory module 500 includes bus interface 520, ID register 521, access control register 503, repair row address registers 550 and 560, repair column address registers 551 and 561, and memory arrays 508 and 518. Memory array 508 includes redundant row sub-array 505, redundant column sub-array 506 and regular memory array 507. Memory array 518 includes redundant row sub-array 515, redundant column sub-array 516 and regular memory array 517.

Test circuitry is included in memory module 500 so that redundant row sub-array 505, redundant column sub-array 506, redundant row sub-array 515, and redundant column sub-array 516 can be tested. Prior art memory redundancy circuits test redundant memory sub-arrays (spare rows and columns) through the use of "tri-level" logic on certain input pins (See, M. Hamada et al, "Semiconductor Memory Apparatus with a Spare Memory Cell Array", U.S. Pat. No. 5,113,371, incorporated by reference). However, the present invention eliminates the requirement of such a tri-level logic arrangement.

In accordance with one embodiment of the present invention, two bits $T_{01}$ and $T_{00}$ within access-control register 503 are dedicated as test-mode bits which allow the redundant row sub-array 505 and redundant column sub-array 506 to be tested. When either or both of test bits $T_{01}$ and $T_{00}$ are set, memory array 508 is placed in a test-mode and access to the regular memory array 507 is disabled.

Table 1 sets forth the various test modes for memory array 508.

TABLE 1

| $T_{01}$ | $T_{00}$ | Result |
|---|---|---|
| 0 | 0 | Normal operation of memory array 508 |
| 0 | 1 | Test redundant column array 506 |
| 1 | 0 | Test redundant row array 505 |
| 1 | 1 | Test both redundant column array 506 and redundant row array 505 |

In a similar manner, test bits $T_{11}$ and $T_{10}$ of access control register 503 are dedicated as test-mode bits for redundant row sub-array 515 and redundant column sub-array 516 of memory array 518.

Figure 5B:
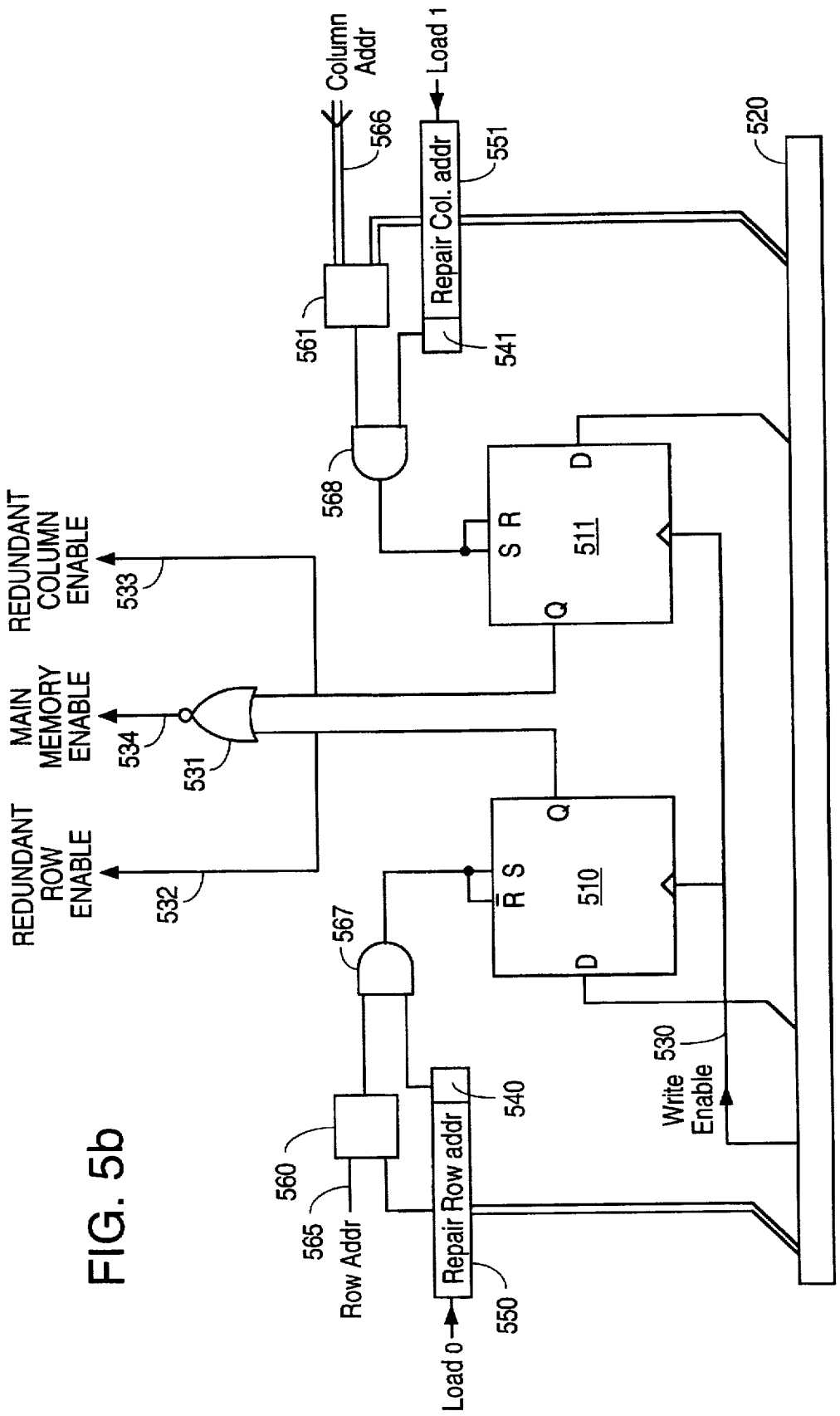
FIG. 5b is a schematic diagram of a circuit facilitating in-system testing and repair using redundant rows and columns.

FIG. 5b is a schematic diagram illustrating circuitry used to generate enable signals for regular memory array 507, redundant row sub-array 505 and redundant column sub-array 506. This circuitry includes flip-flops 510 and 511, write enable lead 530, NOR gate 531, address comparators 560 and 561, repair row address register 550, repair column address register 551, repair enable bits 540 and 541, AND gates 567 and 568, row address lead 565 and column address lead 566. The Q outputs of D-type flip-flops 510 and 511 are used to enable (or disable) redundant sub-arrays 505 and 506, respectively, (FIG. 5a). The Q outputs of flip-flops 510 and 511 are also provided to NOR gate 531 to generate a signal which disables (or enables) regular memory array 507 (FIG. 5a). Thus, a high output on lead 532 enables redundant row sub-array 505 and creates a low output on lead 534, thereby disabling memory array 507. Similarly, a high output on lead 533 enables redundant column sub-array 505 and creates a low signal on lead 534, thereby disabling memory array 507.

Test bits $T_{01}$ and $T_{00}$ can be programmed from DASS bus (through bus interface 520). To program both test bits $T_{01}$ and $T_{00}$, bus interface 520 provides a logic high signal to the D inputs of flip-flops 510 and 511. In addition, bus interface 520 asserts a write enable signal on lead 530 (FIG. 5b), thereby causing test bits $T_{01}$ and $T_{00}$ to go high. This test-mode circuitry allows for in-system testing of the redundant row and column sub-arrays 505 and 506.

The test-mode circuitry illustrated in FIG. 5b also facilitates the replacement of defective rows and columns with rows and columns of redundant row and column sub-arrays 505 and 506. The following example describes the replacement of a defective row. The replacement of a defective column is performed in substantially the same manner.

To replace a defective row, the address of the defective row is written from bus interface 520 to repair row address register 550. The repair enable bit 540 of repair row address register 550 is set to a logic high state, thereby providing a high signal to one input of AND gate 567. The contents of repair row address register 550 are compared with the current row address received on row address lead 565 using address comparator 560. When the row address on lead 565 matches the contents of repair row address register 550, the output of comparator 560 transitions to a high state, thereby causing AND gate 567 to provide a logic high signal to the Set and Reset bar inputs of flip-flop 510. As a result, the Q output of flip-flop 510 transitions to a logic high state, thereby enabling redundant row sub-array 505 and disabling regular memory array 507.

In one embodiment of the present invention, the redundant row sub-arrays 505 and 515 each have one redundant row, and the redundant column sub-arrays 506 and 516 each have 64 redundant columns. However, only one repair column address register is provided for each memory array and the columns are repaired in groups of 64. The repair enable bits 540 and 541 and the repair address registers 550 and 551 are incorporated as part of the access-control register 503 and are programmable through a command from bus interface 520 (as previously discussed) or through a fuse.

Memory Operations

As in a conventional DRAM, an access to memory modules 111–128 is divided into two steps: a row access (RAS) operation followed by a column access (CAS) operation. A RAS operation requires the base, array, and row addresses. The RAS operation causes data in the designated row of the designated array to be transferred to the sense-amplifier latches. A CAS operation requires the base, array and column addresses. The CAS operation causes the data stored in the sense-amplifier latch designated by the column address to be input or output to DASS bus 102. Once data is latched in the sense-amplifiers, subsequent accesses to the different locations of the same row can be carried out directly using separate CAS operations without having to perform another RAS operation. Access to the sense-amplifier latches is much faster than direct access to the memory cells because the sense-amplifiers have a much stronger signal drive.

In conventional DRAM, the RAS operation is signaled by a RAS control signal which must remain activated throughout the RAS and CAS access. However, in the present invention, the RAS and CAS operations are signaled by a command code on the control bus C[3:0]. The command code does not need to be maintained throughout the access operation. In fact, once a RAS operation is performed, data latched in the sense amplifiers stays there until a precharge operation is executed.

The precharge operation causes data in the sense-amplifier latches to be transferred to the row of DRAM cells designated by the original RAS operation. The precharge operation also triggers equalization on the outputs of the sense-amplifiers and the bit lines so that the memory array is prepared for the next RAS operation. As previously described, only part of the memory address is needed for each memory operation. That is, the column address is not needed in a RAS operation and the row address is not needed in a CAS operation. This allows the memory address for each operation to be transmitted over a relatively narrow address bus (16-bit) in half of a clock cycle, thereby minimizing access latency and making it possible to access the memory both synchronously and asynchronously.

To access a memory array in the precharged state, two operations, which take two bus clock cycles, are required. Since transferring data from a memory array to the sense-amplifiers usually takes more than 20 ns (longer than one clock cycle), the command protocol of the present invention does not increase the memory access latency (RAS access time). The command protocol of the present invention can be extended to any memory device have a row access time substantially longer than column access time without increasing the access latency of the memory device.

The RAS-CAS-Precharge protocol of the present invention advantageously allows the memory device to operate both synchronously and asynchronously. This aspect of the present invention is described in more detail below.

Data transfer to and from the sense-amplifiers is carried out in bursts. After accessing data identified by the CAS address, data in subsequent CAS addresses is automatically accessed by an address sequencing circuit, without submitting a new command or address. A word of data can be read or written every clock cycle, and an entire row of data, e.g., 32 words, can be accessed in one burst of 32 clock cycles. Because each memory array has its own address sequencing circuitry and column accessing circuitry, which are described in more detail below, each memory array is capable of operating at the same frequency as the bus clock. In fact, a memory array in accordance with the present invention can handle data bursts up to 1 gigabyte/second.

Memory arrays in conventional DRAM schemes are incapable of providing data at this frequency. In prior art DRAM schemes, the data accessed from the DRAM is supplied by several memory arrays and each memory array is operating at a significantly bower data bandwidth than the data I/O bandwidth. (See, for example, PCT patent document PCT/US91/02590 [Farmwald et al]; "A 100 MHz 4 Mb Cache DRAM with Fast Copy-back Scheme" [K. Dosaka, Y. Konishi, K. Hayano, K. Himukashi, A. Yamazaki, C. A. Hart, M Kumanoya, H. Hamano, and T. Yoshihara, *ISSCC*, 1992, pp. 148–149]).

Column Accessing Circuitry

Figure 6:
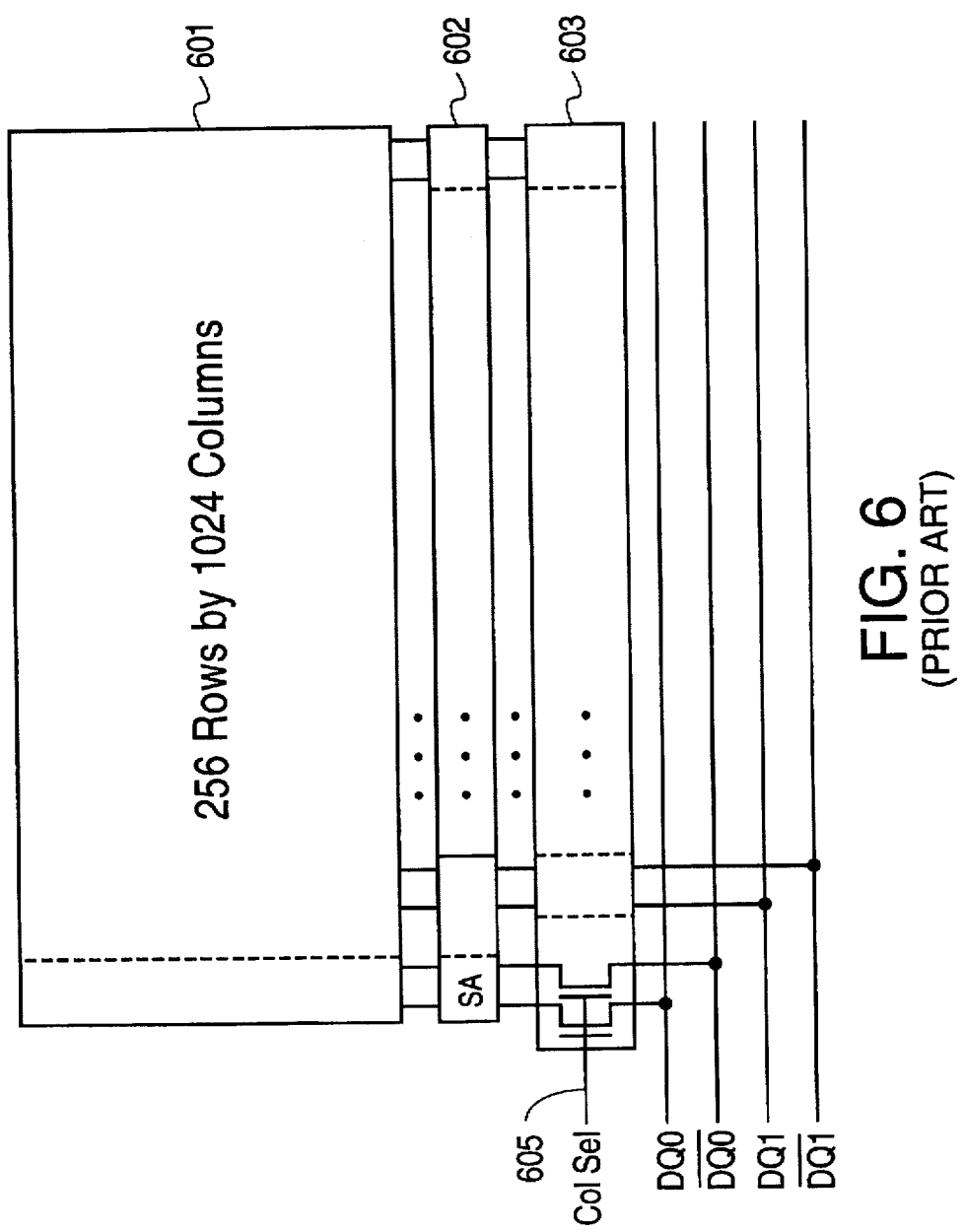
FIG. 6 is a block diagram illustrating a data path in a column area of a conventional DRAM device.

FIG. 6 shows the data path in the column area of a memory array in a conventional DRAM. Memory array 601 includes 256 rows and 1024 columns of memory cells. Two complimentary bit lines connect each column in memory array 601 to a sense-amplifier (SA) latch in sense-amplifier circuit 602. The two outputs of each SA latch are connected to a corresponding column select switch in column switch circuit 603. The column select switches in column switch circuit 603 are controlled by signals on column select bus 605. When the column select switches corresponding to an SA latch are closed, the SA latch is coupled to a corresponding complementary pair of data lines. Memory cell array 601 typically uses two data line pairs, (1) DQ0, DQ0 bar and (2) DQ1, DQ1 bar. (See, "A 50-uA Standby 1M×1/256K×4 CMOS DRAM with High-Speed Sense Amplifier", S. Fujii et al, IEEE JSSC, vol. sc-21, no., 5, Oct. 1986, pp. 643–648; and "A 60-ns 4-Mbit CMOS DRAM with Built-In Self-Test Function", T. Ohsawa et al, IEEE JSSC, vol. sc-22, no. 5, Oct. 1987, pp. 663–668).

In column select circuit 603, 512 column switches are multiplexed on each data line pair. Each data line runs along the long side of memory array 601. Consequently, the data line capacitance is large (about 4 to 5 pf). During read operations, this data line capacitance is driven by the SA latches through the column switch circuit 603. The SA latches have a relatively weak drive capability. Consequently, signals on the data lines have long rise and fall times, thereby limiting the read data bandwidth.

During write operations, the data line capacitance is less of a problem because the data lines are driven directly by a relatively large write buffer located outside of memory array 601. However, the write cycle-time is determined by the write delay of the SA latch and the delay mismatch between the column address decoding path and the write data path. The latter delay can be significant because the column address decoding path and the data path are routed in different ways.

Figure 7:
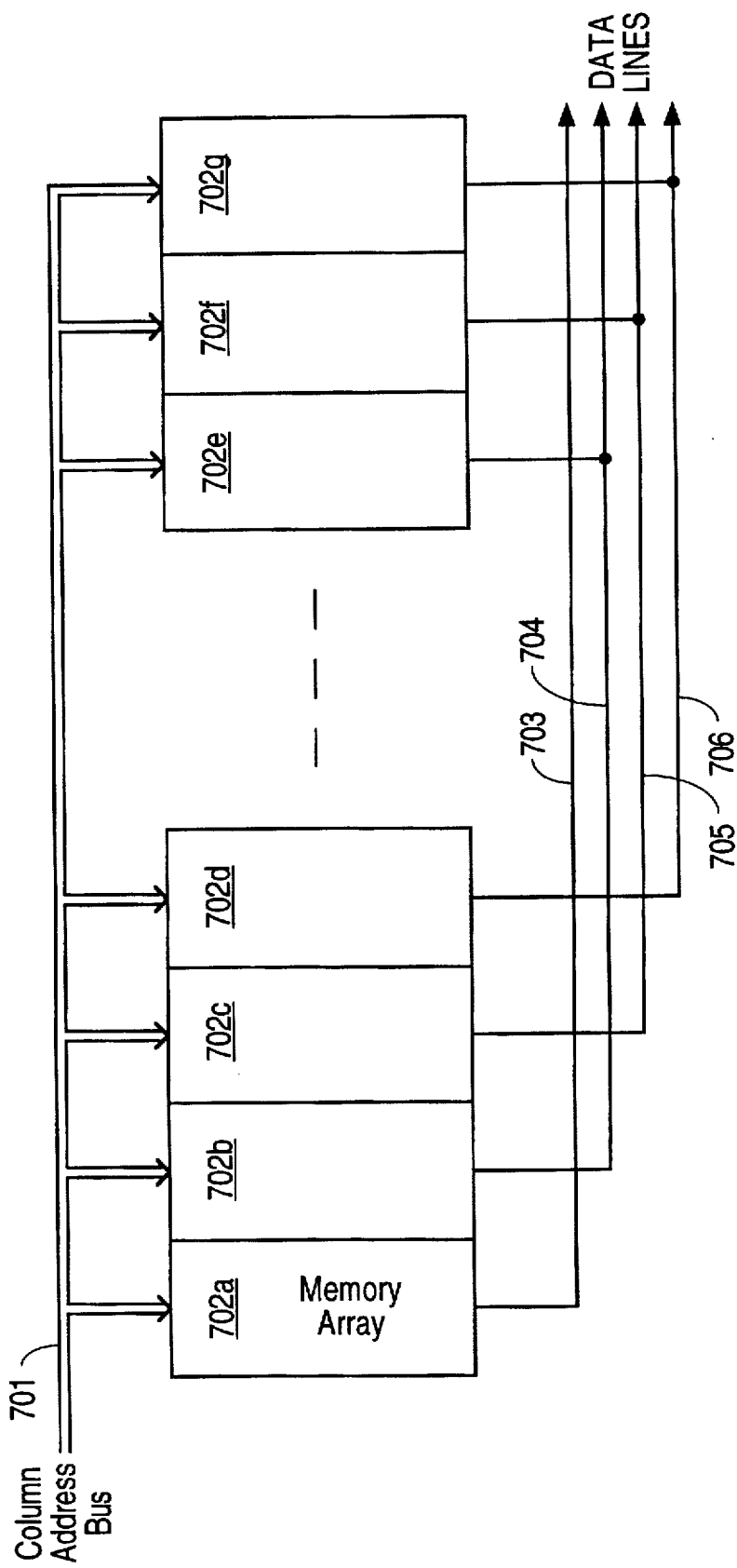
FIG. 7 is a block diagram illustrating routing of column address and data lines in a conventional 4 M-bit DRAM device.

FIG. 7 is a block diagram illustrating the column address decoding path and the data path of a typical prior art DRAM device. The column address bus 701 is connected in parallel to the memory arrays 702a–702g. However, the data path is made up of data lines 703–706 from several arrays. Consequently, the difference in loading and logic between the two paths is substantial.

Figure 8:
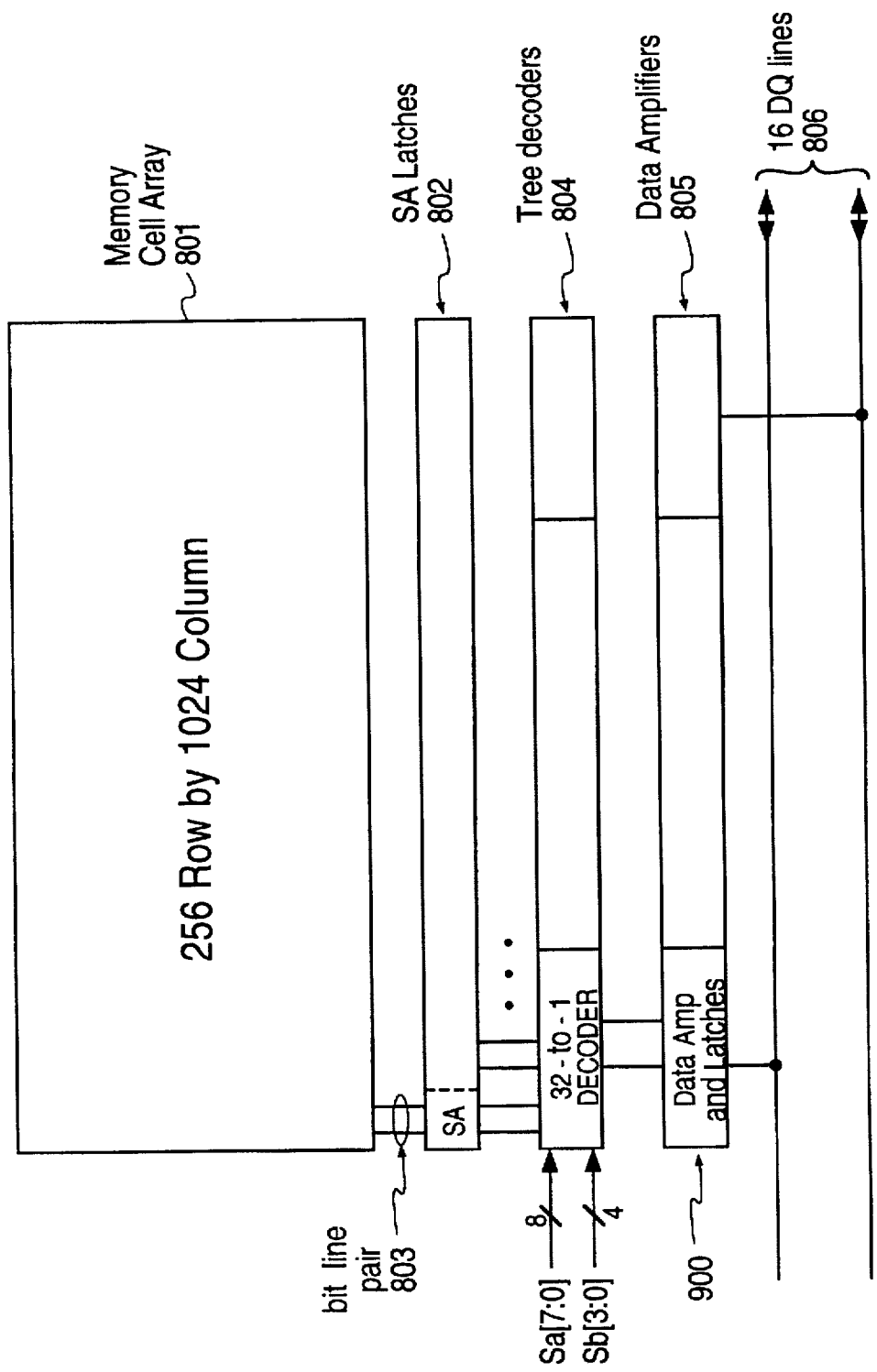
FIG. 8 is a block diagram illustrating column circuitry in accordance with one embodiment of the present invention.

FIG. 8 is a block diagram of a column data path in accordance with one embodiment of the present invention. Each column of memory array 801 is connected to an SA latch in sense-amplifier circuit 802 by a bit line pair, such as bit line pair 803. The outputs of sense-amplifier circuit 802 are provided to tree decoder circuit 804. Tree decoder circuit 804 includes thirty two 32-to-1 tree decoders. Each 32-to-1 tree decoder receives the complementary inputs from thirty two SA latches. Each 32-to-1 tree decoder includes two levels of switches. A first level, which is controlled by an 8-bit signal Sa[7:0], is constructed with four 8-to-1 multiplexers. The second level, which is controlled by a 4-bit signal Sb[3:0], includes a 4-to-1 multiplexer. Each input to the 4-to-1 multiplexer is coupled to an output of one of the 8-to-1 bit multiplexers. Each 32-to-1 tree decoder provides a pair of complementary outputs to data amplifier circuit 805. These complementary outputs correspond to the two outputs of the SA latch of the selected column.

Data amplifier circuit 805 includes thirty two data amplifiers. Each data amplifier receives the complementary outputs from a corresponding 32-to-1 decoder. The thirty two data amplifiers are grouped into sixteen pairs. Each data amplifier pair provides a multiplexed signal to one of sixteen data lines.

Figure 9:
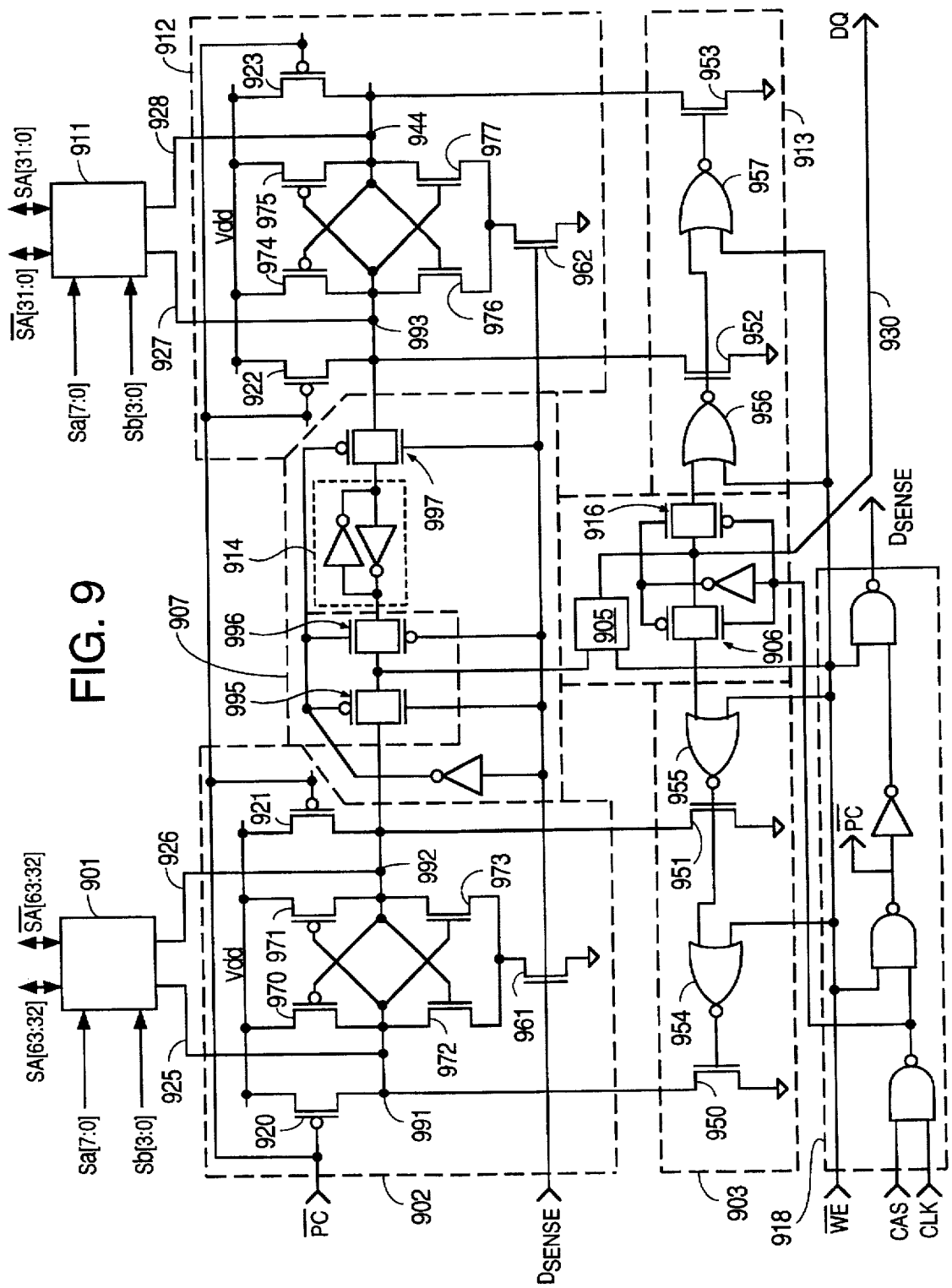
FIG. 9 is a schematic diagram of column circuitry in accordance with one embodiment of the present invention.

FIG. 9 is a schematic diagram of tree decoders 901 and 911 and data amplifier pair 900. Data amplifier pair 900 includes data amplifiers 902 and 912, multiplexer 907, read data latch 914, write buffers 903 and 913, tri-state buffer 905 and clock generation circuit 918.

The complementary outputs of tree decoders 901 and 911 are provided to data amplifiers 902 and 912, respectively. Data amplifiers 902 and 912 are regenerative latches controlled by a single phase clock signal $D_{SENSE}$.

A local self-timed clock circuit 918 generates the control signals used to control data amplifiers 902 and 912 and multiplexer 907. Thus, a precharge signal, $\overline{PC}$, and a sensing signal, $D_{SENSE}$, are generated in response to bus clock signal, Clk, column_access (CAS) signal and pre-charge signal, Write_Enable. The Clk signal is a buffered version of the Sck signal. The PC and $D_{SENSE}$ signals are local signals which are not used to drive any circuitry outside data amplifier pair 900. Thus, timing skew in the control signals is minimized.

Read operation

To perform a read operation, the Write_Enable signal is de-asserted high. As a result, transistors 950–953 of write buffers 903 and 913 are turned off and tri-state buffer 905 is placed in a low impedance state. The CAS signal is asserted high. During a first half cycle of the Clk signal, the Clk signal is in a logic high state, thereby forcing the both the $D_{SENSE}$ and PC signals to a logic high state. Under these conditions, the complementary outputs of tree decoders 901 and 911 are latched in data amplifiers 902 and 912, respectively.

For example, a logic low signal on lead 925 and a logic high signal on lead 926 cause transistors 971 and 972 to turn on and transistors 970 and 973 to turn off. The high $D_{SENSE}$ signal causes transistor 961 to turn on. As a result, node 991 is pulled down to ground through transistors 972 and 961 and node 992 is pulled up to $V_{dd}$ through transistor 971. In a similar manner, a logic low signal on lead 926 and a logic high signal on lead 925 results in node 992 being pulled to ground through transistors 973 and 961 and node 99i being pulled to $V_{dd}$ through transistor 970.

Data amplifier 912 operates in the same manner as data amplifier 902 to latch the signals present on leads 927 and 928. Thus, a logic high signal on lead 927 and a logic low signal on lead 928 results in node 993 being pulled up to $V_{dd}$ through transistor 974 and node 994 being pulled down to ground through transistors 977 and 962. Similarly, a logic low signal on lead 927 and a logic high signal on lead 928 results in node 993 being pulled to ground through transistors 976 and 962 and node 994 being pulled to $V_{dd}$ through transistor 975.

Within multiplexer 907, the high $D_{SENSE}$ signal causes transmission gates 995 and 997 to close (i.e., be placed in a conducting state) and transmission gate 996 to open (i.e., be placed in a non-conducting state). As a result, the voltage on node 992 is transmitted through transmission gate 995 and tri-state buffer 905 to the DQ data line 930. DQ data line 930 connects tri-state buffer 905 directly to the bus transceivers in the memory bus interface (See, e.g., inverters 304 and 306 in FIGS. 3 and 4). This connection results in little loading other than the routing capacitance because there is no other signal multiplexed on this line. Loading of DQ data line 930 is thus substantially smaller than that present in prior art schemes. Consequently, the DQ data lines of the present invention are capable of operating at much higher frequency (up to 250 Mhz).

In addition, the voltage on node 933 is transmitted through transmission gate 997 and is stored in read data latch 914.

During the second half cycle of the Clk signal, the Clk signal transitions low, thereby forcing both the $D_{SENSE}$ and PC signals low. In response to the low PC signal, transistors 920–923 are turned on. As a result, leads 925–928 are coupled to $V_{dd}$ (i.e., leads 925–928 are precharged). In addition, the low $D_{DENSE}$ signal opens transmission gates 995 and 997 and closes transmission gate 996. As a result, the voltage stored in read data latch 914 is read out through transmission gate 996 and tri-state buffer 905 to DQ data line 930 during the second half cycle. In the foregoing manner, dual-edge transfer of data from array 801 (FIG. 8) to data lines 806 is facilitated.

Write operation

To perform a write operation, the Write_Enable signal is asserted low, thereby placing tri-state buffer 905 in a high-impedance state and applying a logic low signal to an input of each of NOR gates 954–957 in write buffers 903 and 913. During a first half cycle of the Clk signal, the Clk signal is in a logic low state, thereby closing transmission gate 906 and opening transmission gate 916. The signal on the DQ data line 930 is therefore routed to an input of NOR gate 955. For example, a high signal on the DQ data line 930 causes NOR gate 955 to provide a logic low signal to transistor 951, thereby turning off this transistor. The low output of NOR gate 954 is also provided to an input of NOR gate 954, causing NOR gate 954 to output a logic high signal which turns on transistor 950.

The low Write_Enable signal also causes the $D_{SENSE}$ and PC signals to go high, thereby turning off p-channel transistors 920–923 and turning on n-channel transistors 961–962. As a result, p-channel transistor 971 and n-channel transistor 972 are turned on. Consequently, tree decoder 901 receives supply voltage $V_{dd}$ on lead 926 and the ground supply voltage on lead 925, thereby writing a high data value to the selected column of memory array 801 (FIG. 8).

If the input from DQ data line 930 is a logic low signal (as opposed to a logic high signal as previously discussed), tree decoder 901 receives ground supply voltage on lead 926 and supply voltage $V_{dd}$ on lead 925 in a manner similar to that previously described above.

During the second half cycle of the Clk signal, the Clk signal transitions to a high state, thereby causing transmission gate 906 to open and transmission gate 916 to close. The signal on the DQ data line 930 is then transmitted through write buffer 913, data amplifier 912 and tree decoder 911 in a manner similar to that previously described. In this manner, data is written from the DQ data line 930 to the memory array during each half cycle of the Clk signal. The demultiplexing performed by transmission gates 906 and 916 is necessary because the address selected by tree decoders 901 and 911 changes only once;every clock cycle.

Tree decoders 901 and 911 limit the multiplexing loading to approximately 12 lines (8+4) (as opposed to 512 lines in a conventional scheme as previously described). The decreased capacitive loading together with the higher drive signal provided by data amplifier circuit 805 increase the data bandwidth.

Delay Matching

High speed write operations are also facilitated by matching the address, data and clock paths. At the chip level, the address and data paths of memory device 100 are matched automatically because they share the same set of bus lines (multiplexed address and data) on the DASS bus (see FIG. 1). Delay matching between the clock and address/data bus lines is relatively easy because the clock is part of the bus and the clock loading is light. As described in more detail later, the clock loading is light because memory modules 111-128 are self-timed and do not rely on a global clock for synchronization.

Inside memory modules 111–128, delay matching is achieved as follows. Gate delay matching is carried out by inserting extra buffers in the paths with shorter delay. Delay mismatch caused by gate loading and routing capacitance mismatches are minimized by using dummy loads.

The dominant source of delay mismatch comes from the column decoders 406a and 406b (FIG. 4). Column decoding includes a predecoding stage and a final decoding stage. In the predecoding stage, five column address lines are split into two groups with three column address lines connected to a 3-to-8 decoder and two column address lines connected to a 2-to-4 decoder. The 3-to-8 and 2-to-4 decoders are conventional decoders, each consisting of two levels of simple logic gates. The final decoding is performed by a 32-to-1 tree decoder (e.g., tree decoder 804 in FIG. 8) in the column area. The above described column decoding scheme simplifies delay matching between the different paths because the address path goes through a relatively few number of simple logic gates when passing through the 3-to-8 and 2-to-4 decoders.

Delay mismatches are further minimized by arranging the clock, the pre-decoded column select signals Sa[7:0] and Sb[3:0] (see FIG. 9), and the DQ lines routed in the same manner through the column area of the memory array.

Address Sequencing Circuitry

Burst transfer of data requires a mechanism that automatically accesses data in consecutive address locations given only the starting address of the data burst. Using the starting address, the memory device generates subsequent addresses which are decoded to select the appropriate column lines. An address sequencer is needed to properly enable the appropriate columns during a burst transfer.

Figure 10:
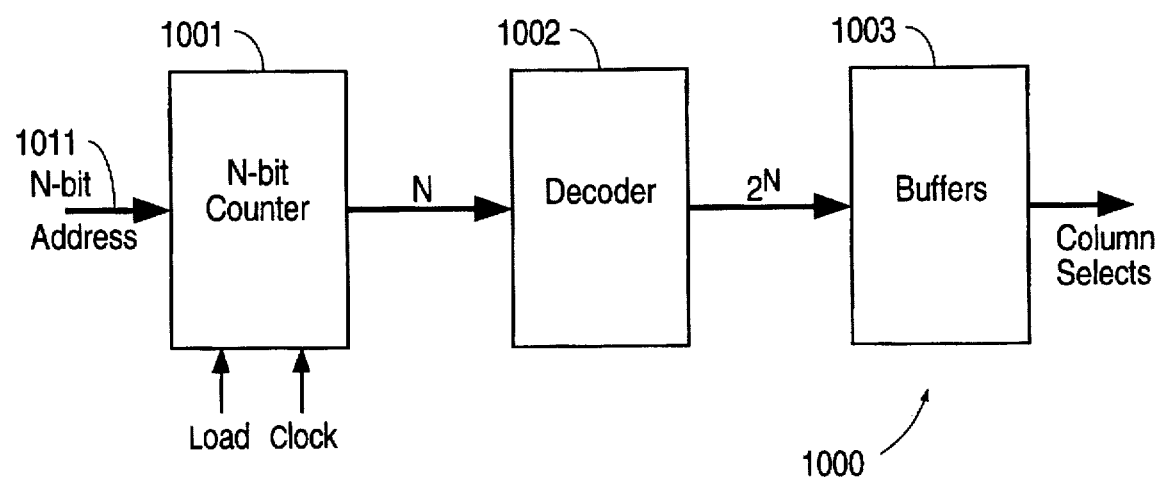
FIG. 10 is a block diagram of a conventional address sequencing scheme.

FIG. 10 is a block diagram of a conventional address sequencer 1000 which includes an n-bit binary counter 1001, an n-to-2n decoder 1002 and a buffer 1003. (See, *Motorola Memory Data Book*, Device MCM62486A, pp. 7-100–7-109, 1992). The starting address is loaded from address bus 1011 to counter 1001 by activating the load signal input to counter 1001. Address advancing is timed by a clock signal input to counter 1001. The output of counter 1001 is decoded by decoder 1002 and then buffered by buffer 1003. The signals provided at the output of buffer 1003 are column select signals that are activated one at a time to gate data words from the sense-amplifier latches. At every rising clock edge, counter 1001 is incremented and its output is decoded to generate the next column select signal to activate the next column select line. The column select lines are thus asserted in consecutive order, with each column select line being asserted for the duration of one clock cycle.

One drawback to address sequencer 1000 is that the total delay from the rising clock edge to the activation of the column select signals is the sum of the clock-to-out delay of counter 1001, the propagation delay of decoder 1002 and the delay through buffer 1003. This total delay limits the burst frequency and therefore the access bandwidth. Another problem arises because the delay paths through decoder 1002 are not uniform for each output transition. Non-uniform decoder delay paths may cause simultaneous assertion of one or more column select signals for the duration of the decoder delay mismatches. As a result, read or write failures may occur, especially during high-speed operation.

Figure 11A:
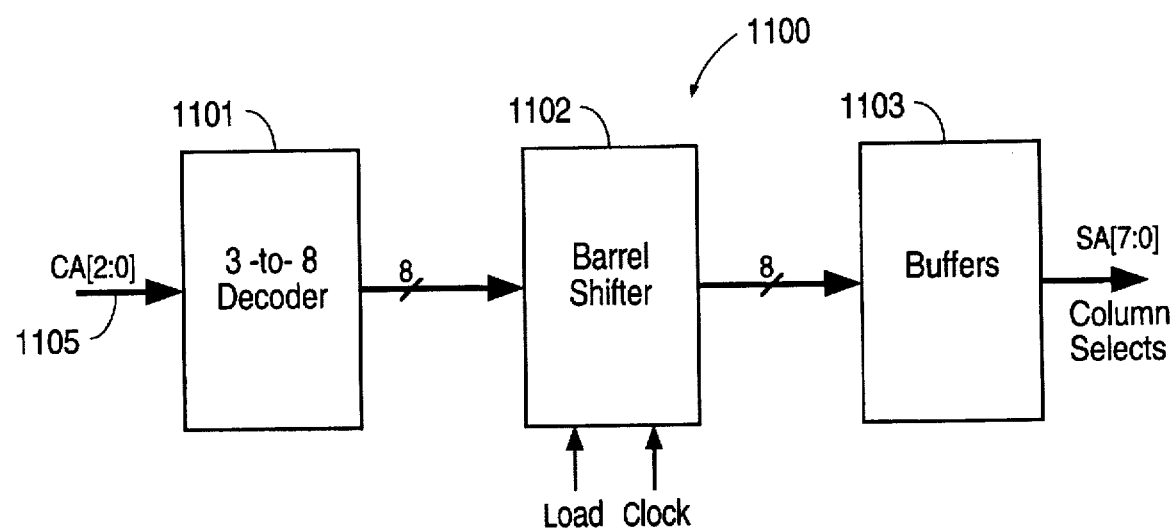
FIG. 11a is a block diagram of an address sequencing scheme in accordance with the present invention.

FIG. 11a is a block diagram of an address sequencer 1100 in accordance with the present invention. For simplicity, 3-bit decoding is shown. It is understood that the same principles can be applied to decode other numbers of bits in accordance with the present invention. Address sequencer 1100 includes a 3-to-8 decoder 1101, an 8-stage barrel shifter 1102 and buffers 1103. The 3-bit starting address is input to decoder 1101 on bus 1105. The 8-bit output of decoder 1101 is loaded into barrel shifter 1102 when the load signal input to barrel shifter 1102 is activated.

Figure 11B:
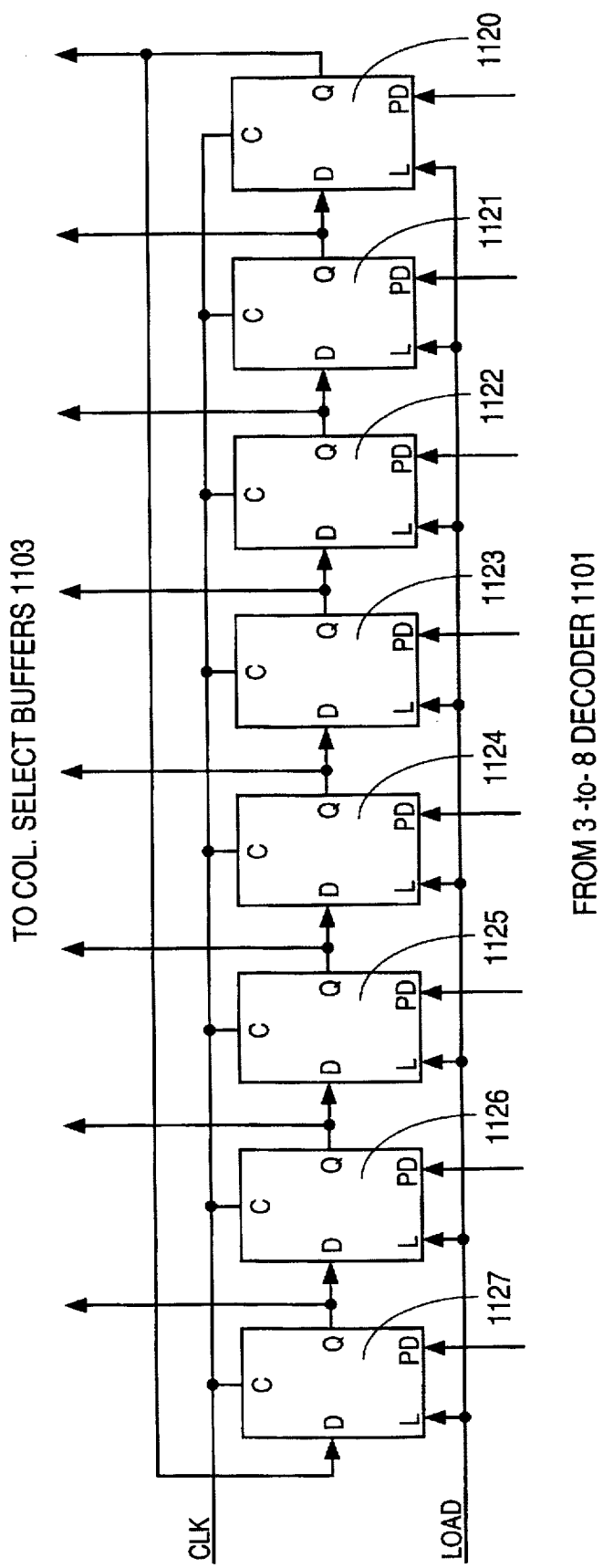

FIG. 11b is a block diagram of one embodiment of barrel shifter 1102. Barrel shifter 1102 includes eight master/slave D-type flip-flops 1120–1127 connected in a ring configuration. The outputs of 3-to-8 decoder 1101 are provided to the PD inputs of flip-flops 1120–1127. Only one bit of the output of 3-to-8 decoder 1101 is high at any given time. A load signal is provided to each of the L inputs of flip-flops 1120–1127 and a clock signal is provided to each of the C inputs of flip-flops 1120–1127. The Q outputs of flip-flops 1120–1127 are provided to column select buffers 1103. Barrel shifter 1102 is capable of shifting right and left for address increment and decrement, respectively. However, for clarity, only the right-shift configuration is shown.

Figure 11C:
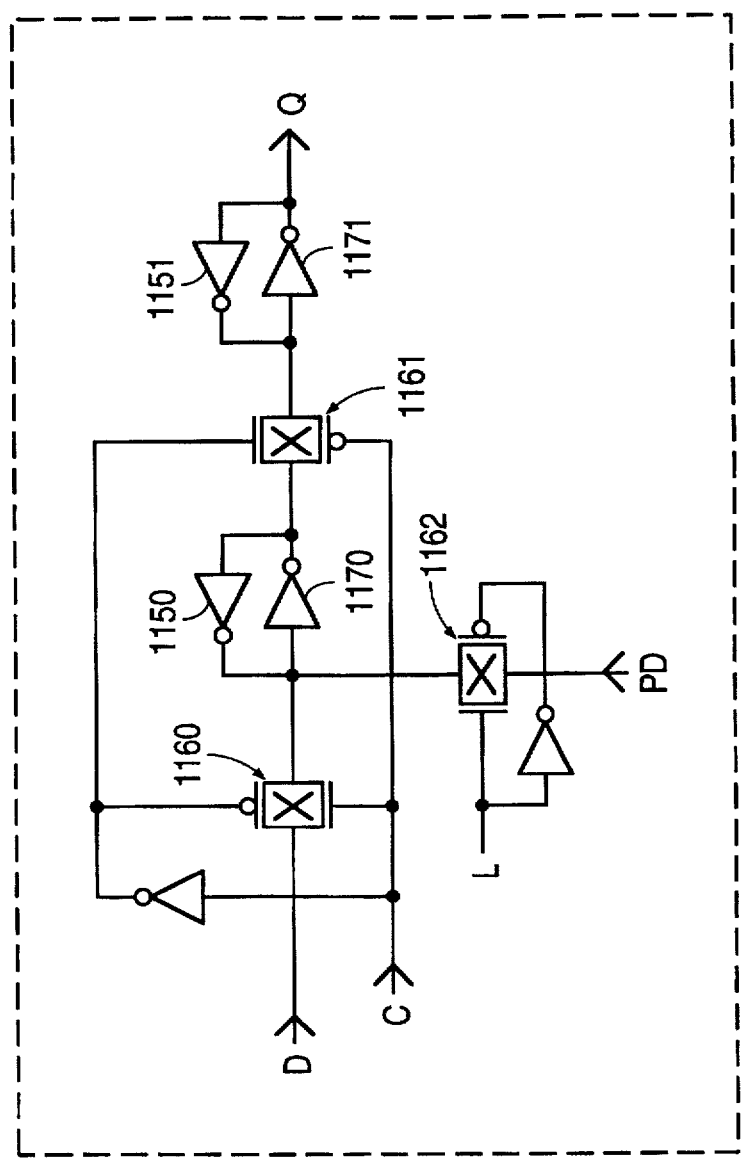
FIG. 11c is a schematic diagram of one of the flip-flops of the barrel shifter of FIG. 11b.

FIG. 11c is a schematic diagram of master/slave D-type flip-flop 1120. In the embodiment illustrated, master/slave D-type flip-flops 1120–1127 are identical. When the load signal is asserted high, transmission gate 1162 is closed and the PD input is stored in the master latch formed by inverters 1150 and 1170. The load signal is only asserted high when the clock signal is low. When the clock signal is low, transmission gate 1160 is open and transmission gate 1161 is closed. As a result, the output of the master latch is transferred to the slave latch formed by inverters 1151 and 1171. The Q output then has the same state as the signal applied to the PD input. Inverters 1150 and 1151 have weak output drive so that they can be easily overcome by the drive of transmission gates 1160 and 1161.

Because the decoded address is loaded simultaneously to both the master and slave stage of D-type flip-flops 1120–1127, the barrel shifter 1102 does not constitute a pipeline stage in the address path.

Once the output of 3-to-8 decoder 1101 has been loaded into flip-flops 1120–1127, the load signal is deasserted low, effectively disconnecting the PD inputs of flip-flops 1120–1127 from 3-to-8 decoder 1101. The high bit which was loaded into barrel shifter 1102 is then circulated through flip-flops 1120–1127 in a cyclical manner, with the high bit shifting one flip-flop during each clock cycle.

The 8-bit output of barrel shifter 1102 is connected through buffer 1103 to consecutive column select lines Sa[7:0] of tree decoders 901 and 911 (FIG. 9). The column select lines Sa[7:0] are thus asserted in consecutive order, one at a time, for the duration of one clock cycle.

The total delay time of address sequencer 1100 is less than the total delay time of conventional address sequencer 1000. This is because address sequencer 1100 does not experience any delay associated with decoder 1101 after the initial address is loaded into barrel shifter 1102. As a result, address sequencing circuit 1100 can operate at much higher frequencies than address sequencer 1000.

Additionally, because flip-flops 1120–1127 are identically constructed, the outputs of barrel shifter 1102 have uniform clock-to-out delays. Furthermore, there are no combinational logic gates between the output of barrel shifter 1102 and column select lines Sa[7:0]. Consequently, the clock-to-column-select-asserted time is well matched for all column select lines, thereby avoiding simultaneous assertion of the column select lines and minimizing read or write failures caused by address transitions.

An additional address sequencing circuit similar to address sequencer 1100 is used to generate four column select signals Sb[3:0] in response to a two-bit input CA[4:3]. As previously discussed, column select signals Sb[3:0] control the second level of switches (i.e., the 4-to-1 multiplexers) in tree decoders 901 and 911 (FIG. 9).

Clocking Scheme

In accordance with the present invention, a clock distribution scheme: (1) allows the memory device to operate both synchronously and asynchronously, (2) minimizes skew to allow high-speed device operations, and (3) reduces operating power.

Memory device 100 (FIG. 1) can operate both asynchronously and synchronously. To achieve synchronous operation, self-timed design techniques, as exemplified by self-timed clock circuit 918 (FIG. 9) described above, and the resynchronization circuit described below, are used in memory modules 111-128.

To meet the requirements of high-speed synchronous operations, delay matching between the control, address and data paths is used. Acceptable delay matching is relatively easy to obtain in the present invention by using the previously described circuit-module architecture and keeping the area of each memory module relatively small. Because the internal operations of each memory module are independent of the internal operations of the other memory modules, timing skew is confined to a relatively small area inside each memory module.

Timing skew is further minimized by the use of self-timed techniques which further localize the distribution of critical control signals. The self-timed techniques enable functional blocks not involved in particular operations to be disabled without a resynchronization penalty for activation. For example, when the Column_Access signal is low and the Write_Enable signal is high, data amplifier pair 900 (FIG. 9) is turned off. As a result, the entire column circuitry is turned off.

The circuit-module architecture also allows any memory module which is not involved with a bus transaction to be automatically shut-down. When DASS bus 102 is not in a data transfer state, i.e., no memory module is being accessed, each memory module decodes commands on the DASS bus during each rising edge of the Sck signal. When a memory read or write command is decoded, each memory module examines the communication ID of the command. All modules, except the module to which the command is addressed, go into an idle state until the read or write transaction is finished. Power dissipation in memory device 100 is therefore confined to small areas and involves only a small number transistors, thereby keeping the overall power consumption of memory device 100 relatively low. Consequently, memory device 100 is suitable for low power applications.

On DASS bus 102, source synchronous transfer is used to meet the synchronous and asynchronous operation requirements. A source clock (Sck) signal and a destination clock (Dck) signal on DASS bus 102 facilitate the source synchronous timing. The Sck signal is used to synchronize data, addresses and commands from the master I/O module 104 to memory modules 111-128. The Dck signal is generated by one of the memory modules 111-128 selected for access to provide synchronization timing for data transmitted from memory modules 111-128 to I/O module 104.

The Dck signal is driven only by the memory module that is transmitting data. The Dck signal is generated within the active memory module by routing the Sck signal through a delay path which approximates the read data path of the memory module. Thus, while the Dck signal has the same frequency as the Sck signal, the Dck signal has no definite phase relationship with the Sck signal or the read data. During synchronous operation, the data output from each memory module must be synchronized with the Sck signal. A resynchronization circuit is therefore used to synchronize the data read from the memory modules to the Sck signal.

Resynchronization circuit

A resynchronization circuit is incorporated in master I/O module 104 (FIG. 1) to synchronize data read from memory modules 111-128 with the Sck signal during synchronous operation. During asynchronous operation, the resynchronization circuit is disabled. That is, data read from memory modules 111-128 flows through the resynchronization circuit with little delay.

Figure 12:
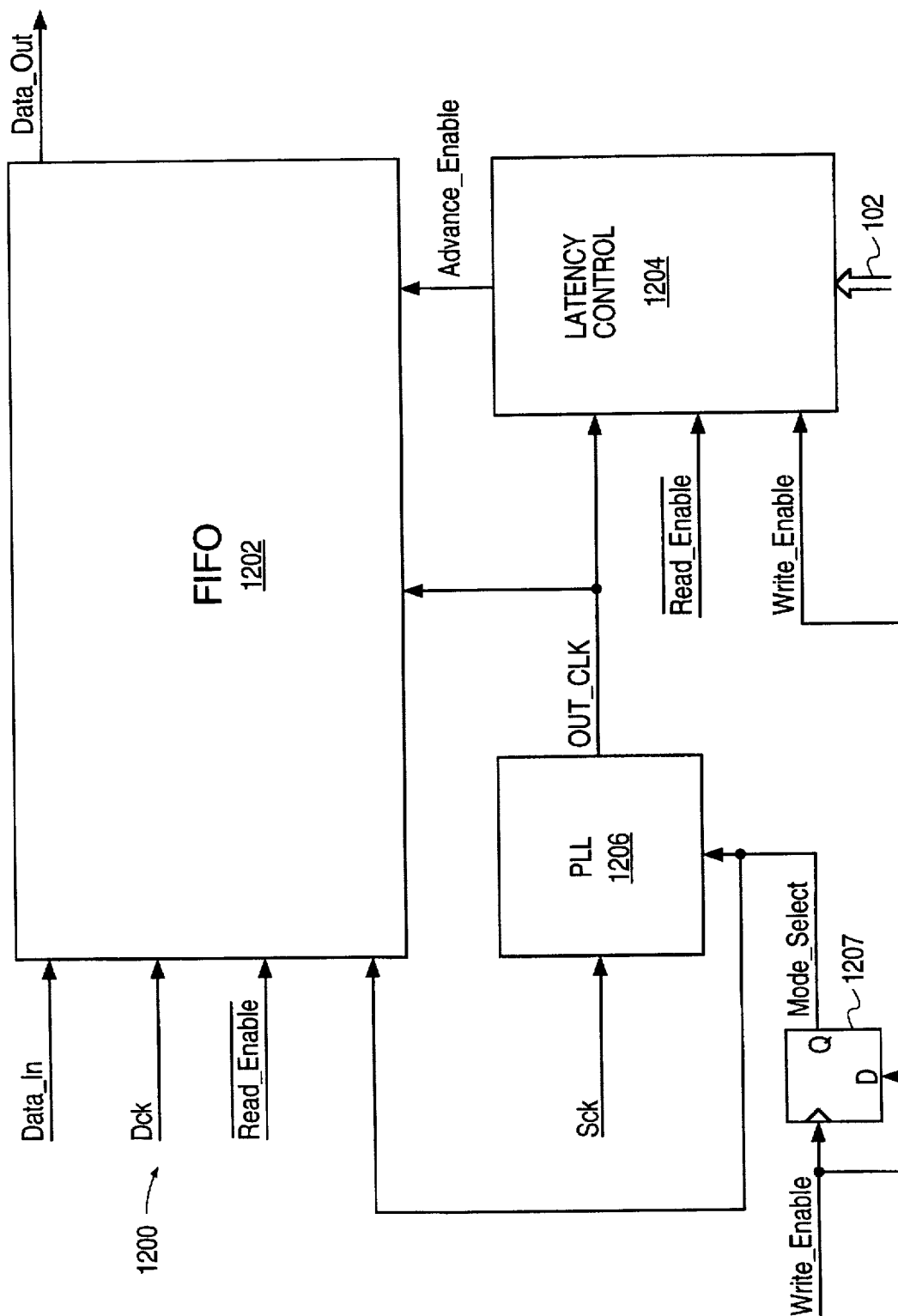
FIG. 12 is a block diagram of a resynchronization circuit in accordance with the present invention.

FIG. 12 is a block diagram of resynchronization circuit 1200 which includes a 4-deep first-in-first-out (FIFO) memory 1202, a latency control circuit 1204, a phase-locked loop (PLL) circuit 1206 and a mode_select flip-flop 1207. FIFO 1202 receives a data input (Data_In) signal from the selected memory modules and provides temporary storage for the data values in the Data_In signal. Write operations within FIFO 1202 are controlled by the Dck signal, the Read_Enable signal and a mode_select signal.

Mode_select flip-flop 1207 is programmed by the Write_Enable signal and another signal received from DASS bus 102. The Q output of mode-select flip-flop 1207 is used as a mode_select signal. The mode_select signal enables FIFO 1202 and PLL 1206 when synchronous operating mode is selected (i.e., the mode_select signal is high). The mode_select signal disables FIFO 1202 and PLL 1206 when asynchronous operating mode is selected (i.e., the mode_select signal is low). PLL circuit 1206 is a conventional circuit which generates an output clock (Out_Clk) signal in response to the Sck signal. The Out_Clk signal is provided to FIFO 1202 and latency control circuit 1204. The Out_Clk signal is selected to ensure that transitions in the Data_Out signal of FIFO 1202 are in phase with the Sck signal (taking into account delays within FIFO 1202).

The programmable latency control circuit 1204 receives the Out_Clk signal, the Read_Enable signal, the Write_Enable signal and an input signal from DASS bus 102. In response, latency control circuit 1204 generates an Output_Enable signal which is provided to FIFO 1202 to control the reading of data values out of FIFO 1202. As discussed in more detail below, latency control circuit allows the user to set the number of half clock-cycles between the time a read command is detected to the time data is output from FIFO 1202.

Figure 13:
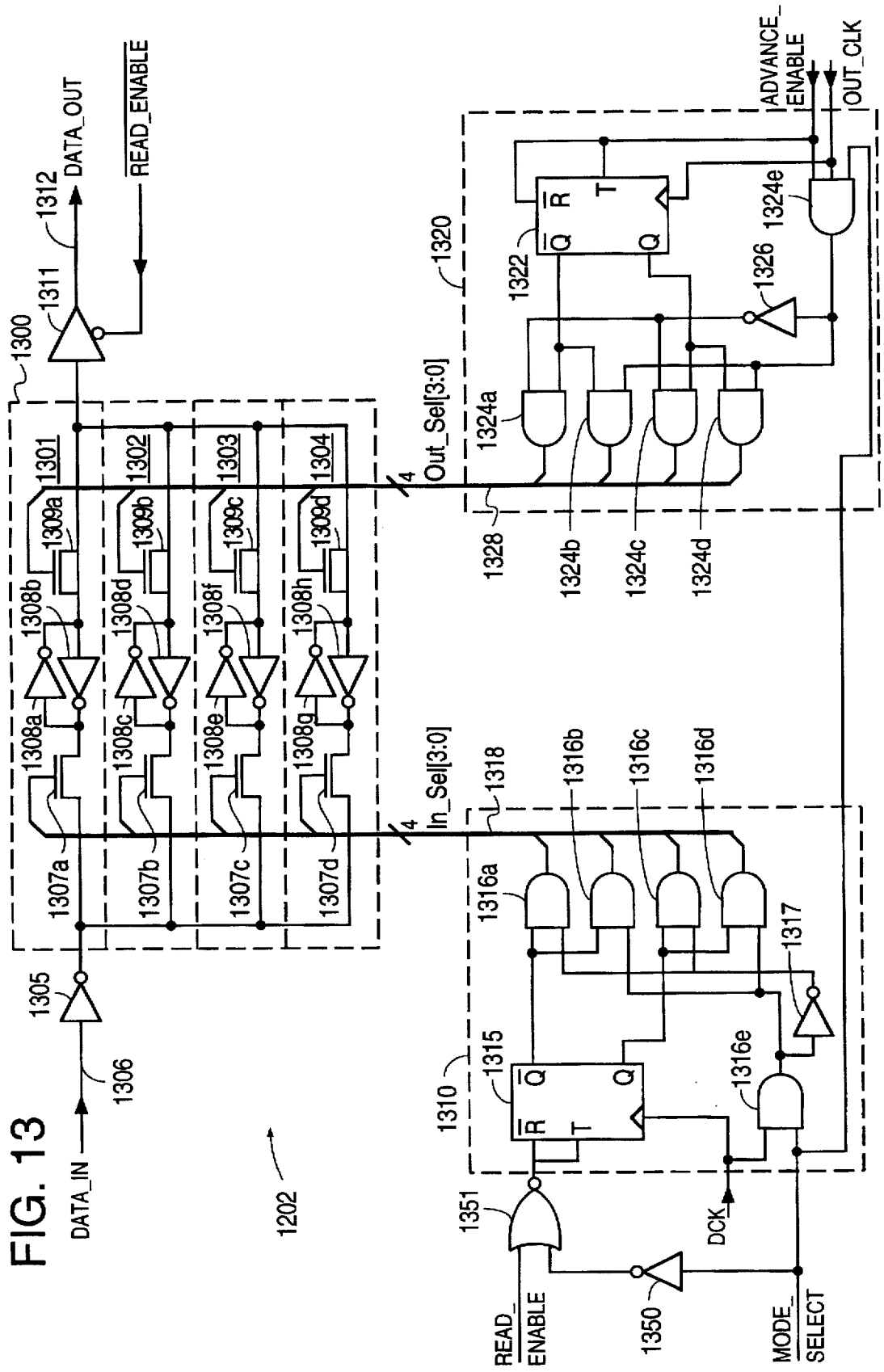
FIG. 13 is a schematic diagram of one embodiment of the FIFO of FIG. 12.

FIG. 13 is a schematic diagram of one embodiment of FIFO 1202. FIFO 1202 contains four data latches 1301-1304, an input sequencer 1310 and an output sequencer 1320. The Data_In signal is provided to data latches 1301-1304 through inverter 1305 on lead 1306. Data latches 1301-1304 include transistors 1307a-1307d, inverters 1308a-1308h and transistors 1309a-1309d. The data values stored in latches 1301-1304 are subsequently transmitted through tri-state buffer 1311 to output lead 1312 as the Data_Out signal. Tri-state buffer 1311 is enabled by the Read_Enable signal.

Transistors 1307a-1307d are controlled by input sequencer 1310. Input sequencer 1310 includes flip-flop 1315, AND gates 1316a-1316e and inverter 1317. Input select bus 1318 couples the outputs of AND gates 1316a-1316d to transistors 1307a-1307d. The outputs of AND gates 1316a-1316d provide input select signals In_Sel0-In_Sel3, respectively.

Transistors 1309a-1309d are controlled by output sequencer 1320. Output sequencer 1320 includes flip-flop 1322, AND gates 1324a-1324e and inverter 1326. Output select bus 1328 couples the outputs of AND gates 1324a-1324d to transistors 1309a-1309d. The outputs of AND gates 1324a-1324d provide output select signals Out_Sel0-Out_Sel3, respectively.

For synchronous operation, the mode select signal is set high. When the Read_enable signal is de-asserted high and the Dck signal is low, input sequencer 1310 is reset so that latch 1301 is selected for input. When Read_enable is asserted low (i.e., after a read command is detected), input sequencer 1310 sequentially generates input select signals In_Sel0-In_Sel3 on input select bus 1318. Input select signals In_Sel0-In_Sel3 sequentially enable transistors 1307a-1307d, respectively, one at a time at each transition of the Dck signal. This causes the data values in the Data_In signal to be stored in consecutive latches 1301-1304.

Before the Output_Enable signal is asserted high, output sequencer 1320 is reset so that latch 1301 is selected for output. When the Output_Enable signal is asserted high, output sequencer 1320 sequentially asserts output select signals Out_Sel0-Out_Sel3 on output select bus 1328. Output select signals Out_Sel0-Out_Sel3 sequentially enable transistors 1309a-1309d, respectively, one at a time at each transition of the Out_Clk signal.

Because FIFO 1202 has four latches, data stored in latches 1301-1304 of FIFO 1202 is over-written every two clock-cycles. Therefore, data cannot remain in FIFO 1202 longer than 2 clock cycles before it is output to lead 1312. Since the Dck signal and the Out_Clk signal have the same frequency, data stored in FIFO 1202 will be output correctly as long as the Out_Clk signal does not lag the Dck signal by more than two clock cycles.

Because of the access latency associated with memory modules 111-128, the Out_Clk signal actually leads the Dck signal. Latency control circuit 1204 prevents the output sequencer 1320 of FIFO 1202 from being enabled until the access latency has expired.

Figure 14A:
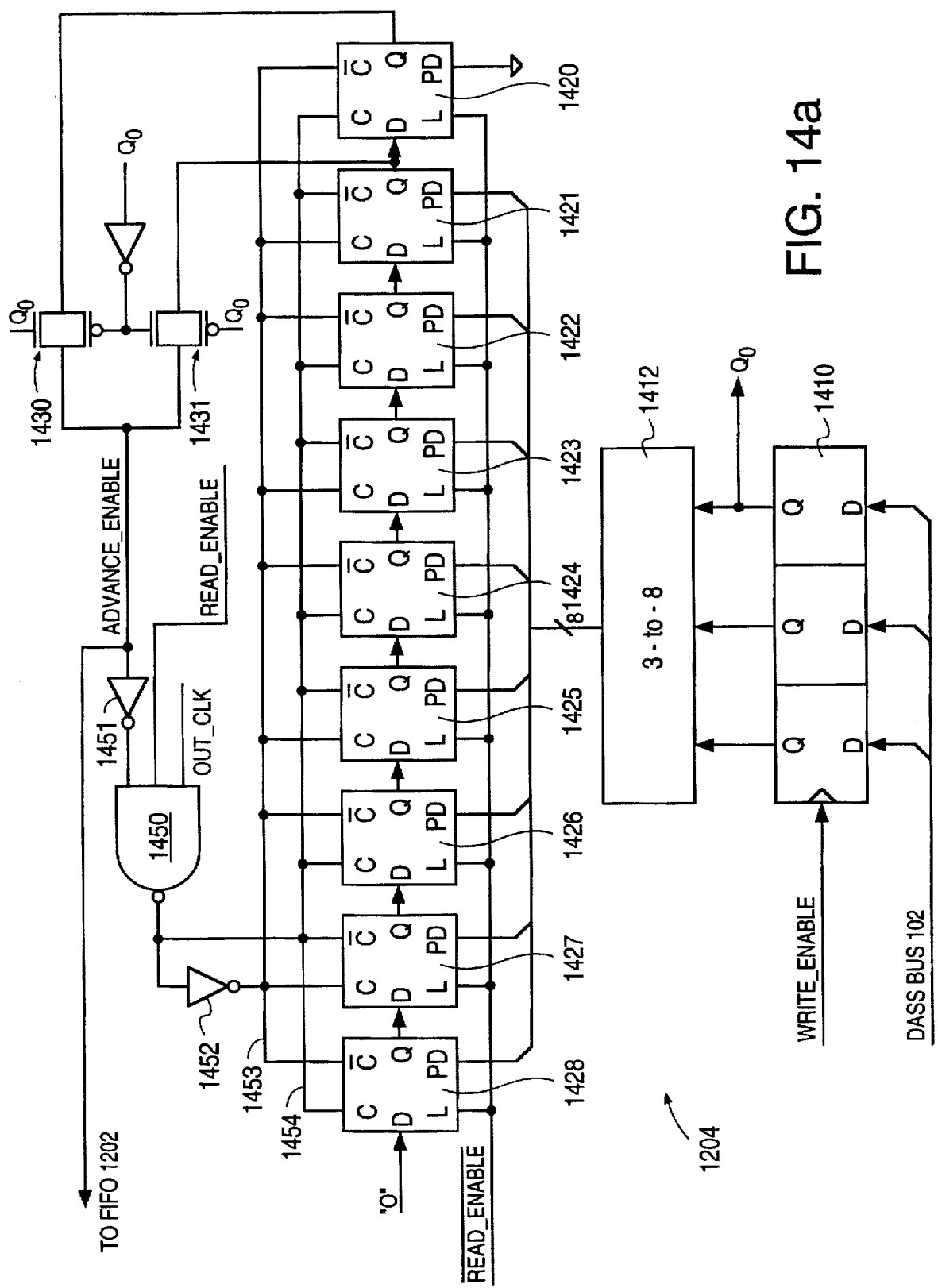
FIG. 14a is a schematic diagram of one embodiment of the latency counter of FIG. 12.
Figure 14B:
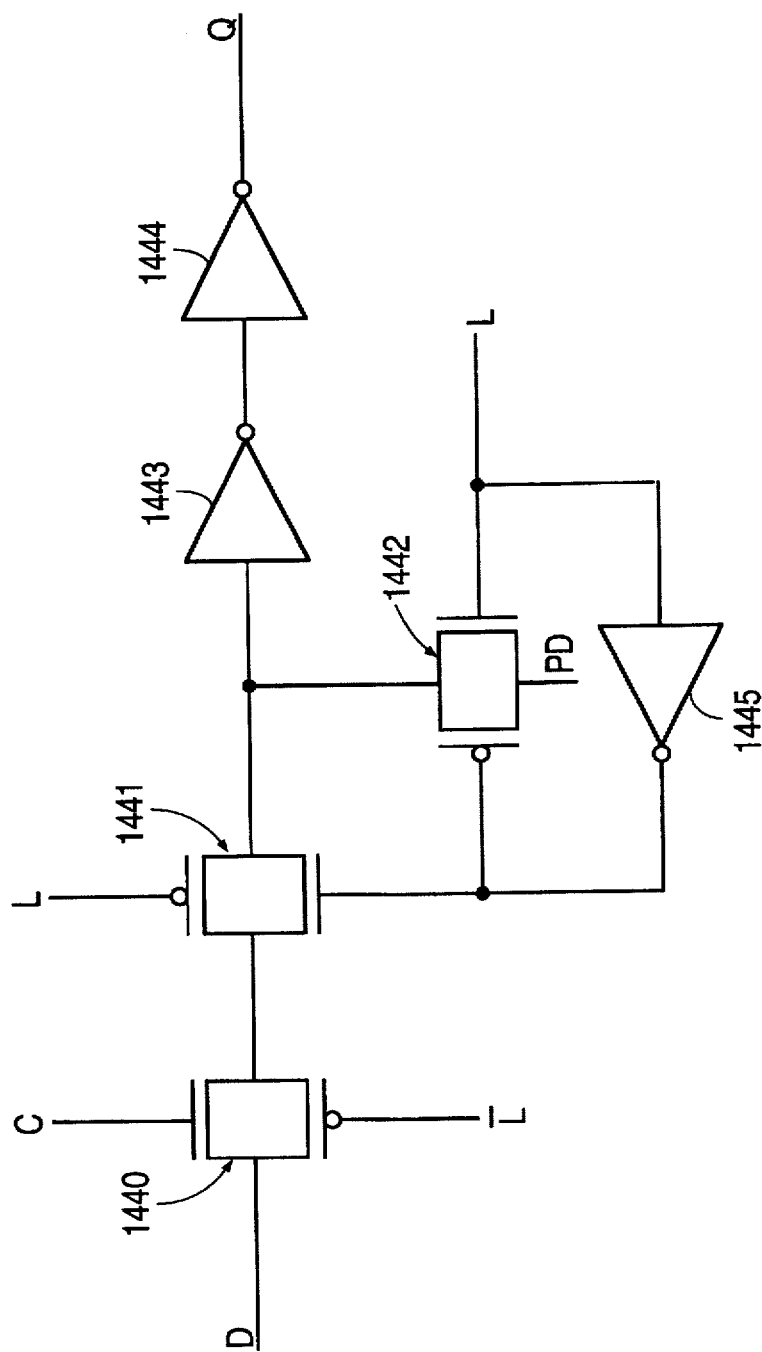

FIG. 14a is a schematic diagram of one embodiment of latency control circuit 1204. Latency control circuit 1204 includes eight latches 1420-1428 connected to form a delay queue. FIG. 14b is a schematic diagram of dynamic latch 1420. Latch 1420 includes transmission gates 1440-1442 and inverters 1443-1445. Latches 1421-1428 are identical to latch 1420.

Latency register 1410 controls the number of clock edges (i.e., half clock cycles) which elapse after a read command is detected before data is output from FIFO 1202. Latency register 1410 can be programmed with a 3-bit input through DASS bus 102 when the Write_Enable signal is asserted. The contents of latency register 1410 are provided to a 3-to-8 decoder 1412. When the Read_Enable signal is high, each of dynamic latches 1420-1428 is isolated from its D input and the outputs of 3-to-8 decoder 1412 are loaded into latches 1421-1428. Latch 1420 is loaded with zero because its PD input is tied to ground.

When the Read_Enable signal is asserted low, latches 1420-1428 are disconnected from 3-to-8 decoder 1412, thereby forming a delay queue. When the selected delay is an even number of half-clock cycles (i.e., Q0=0), the Q output of latch 1421 is routed through transmission gate 1431 to provide the Advance_Enable signal. When the selected delay is equal to an odd number of half-clock cycles (i.e., Q0=1), the Q output of latch 1420 is routed through transmission gate 1430 to provide the Advance_Enable signal. Latch 1420 is provided to assure that the desired odd half clock cycle delay is properly implemented.

For example, if one half clock cycle of delay is desired, latches 1420 and 1422-1428 are loaded with "0"s and latch 1421 is loaded with a "1". The value of Q0 is 1, thereby closing transmission gate 1430. When the Read_Enable signal goes high, a delay queue is formed. This delay queue is clocked by the output of NAND gate 1450. NAND gate 1450 receives the Read_Enable signal, the Out_Clk signal and the Advance_Enable bar signal. The Advance_Enable bar signal is created by transmitting the output of transmission gate 1430 through inverter 1451.

Because the Read_Enable and Advance_Enable bar signals are high, the Out_Clk signal determines the output of NAND gate 1451. Because the Out_Clk signal is initially high, the output of NAND gate 1450 on lead 1454 is initially low. The output of NAND gate 1450 is also transmitted through inverter 1452 to lead 1453. As a result, the transmission gate 1440 (FIG. 14b) of latch 1420 is initially open.

During the next half clock cycle, the Out_Clk signal transitions to a low state, thereby resulting in high and low signals on leads 1454 and 1453, respectively. As a result, transmission gate 1440 (FIG. 14b) of latch 1420 closes and the data value stored in latch 1421 (i.e., "1") is transmitted through inverters 1443 and 1444 of latch 1420. This "1" value is transmitted through transmission gate 1430, resulting in a high Advance_Enable signal (and a low Advance_Enable bar signal). The high Advance_Enable signal enables the output stage of FIFO 1202.

The low Advance_Enable bar signal forces the output of NAND gate 1450 to a logic high state, thereby stopping the clocking of the latches 1420-1428. As a result, the Advance_Enable signal remains high until the read transaction is terminated (i.e., the Read_Enable signal is deasserted).

The latency control circuit 1204 illustrated in FIGS. 14a and 14b operates in a similar manner for even clock cycle delays.

Resynchronization circuit 1200 operates correctly if the number of half clock cycles programmed into latency register 1410 is greater than the access latency and smaller than access latency plus 4 half-clock cycles (i.e., two clock cycles).

Figure 15:
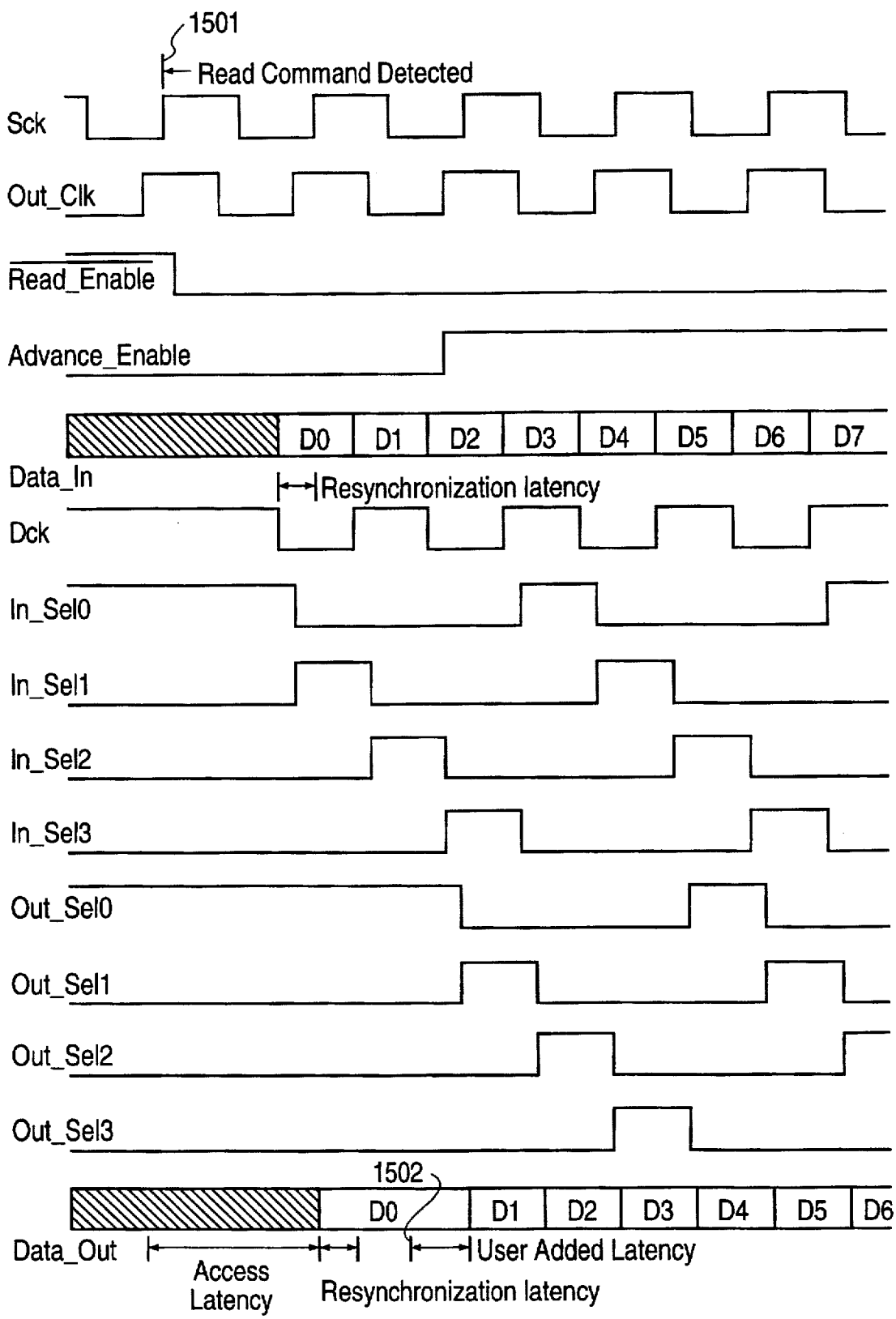
FIG. 15 is a waveform diagram illustrating timing waveforms of the resynchronization circuit of FIG. 12 when the device operating synchronously.

FIG. 15 is a waveform diagram which illustrates the timing of various data and control signals during synchronous operation with latency register 1410 set to a four half-cycle delay. A read command is detected at the rising edge of the Sck signal at point 1501. After a slight delay, the Read_Enable signal is asserted low. Once the access latency has expired, data value D0 of the Data_In signal is written into FIFO 1202. In this example, the access latency is less than one period of the Sck clock signal.

Upon receiving the Dck signal, input sequencer 1310 (FIG. 13) sequentially generates input select signals In_Sel0-In_Sel3. Input select signal In_Sel0 is initially high, thereby turning on transistor 1307a and allowing data value D0 to be written into latch 1301. Shortly after the Dck signal transitions to a low state, input select signal In_Sel0 is de-asserted and input select signal In_Sel1 is asserted, turning on transistor 1307b and allowing data value D1 to be written into latch 1302. This process is continued, with input select signals In_Sel0-In_Sel3 sequentially enabling transistors 1307a-1307d to write data values into latches 1301-1304.

Because the Output_Enable signal is initially low, output select signal Out_Sel0 is initially high. Consequently, transistor 1309a is initially closed and data value D0 is transmitted out of FIFO 1202 to output lead 1312 once the access latency has expired. A short flow through latency associated with transmitting the data value D0 through latch 1301 is not illustrated in FIG. 15.

Because latency register 1410 has been programmed with a four half-cycle delay, the Output_Enable signal transitions to a high state during the fourth transition of the Out_Clk signal after the Read_Enable signal is asserted. Shortly after the Output_Enable signal transitions to a high state, output select signal Out_Sel0 transitions to a low state and output select signal Out_Sel1 transitions to a high state, thereby opening transistor 1309a and closing transistor 1309b. As a result, data value D1 is read out of latch 1302 to output lead 1312. The delay introduced by latency register 1410 spans the resynchronization latency as well as the access latency. The resynchronization latency is the difference between the Sck signal and the Dck signal. Given the waveform diagram of FIG. 15, the data value D1 could have been read out at point 1502 if the latency register 1410 had been programmed for a three half clock cycle delay. However, by programming latency register 1410 with a four half clock cycled delay, the user is able to add a half cycle of latency.

This process is continued, with output select signals Out_Sel0-Out_Sel3 sequentially enabling transistors 1309a-1309d to read data values out of latches 1301-1304.

Figure 16:
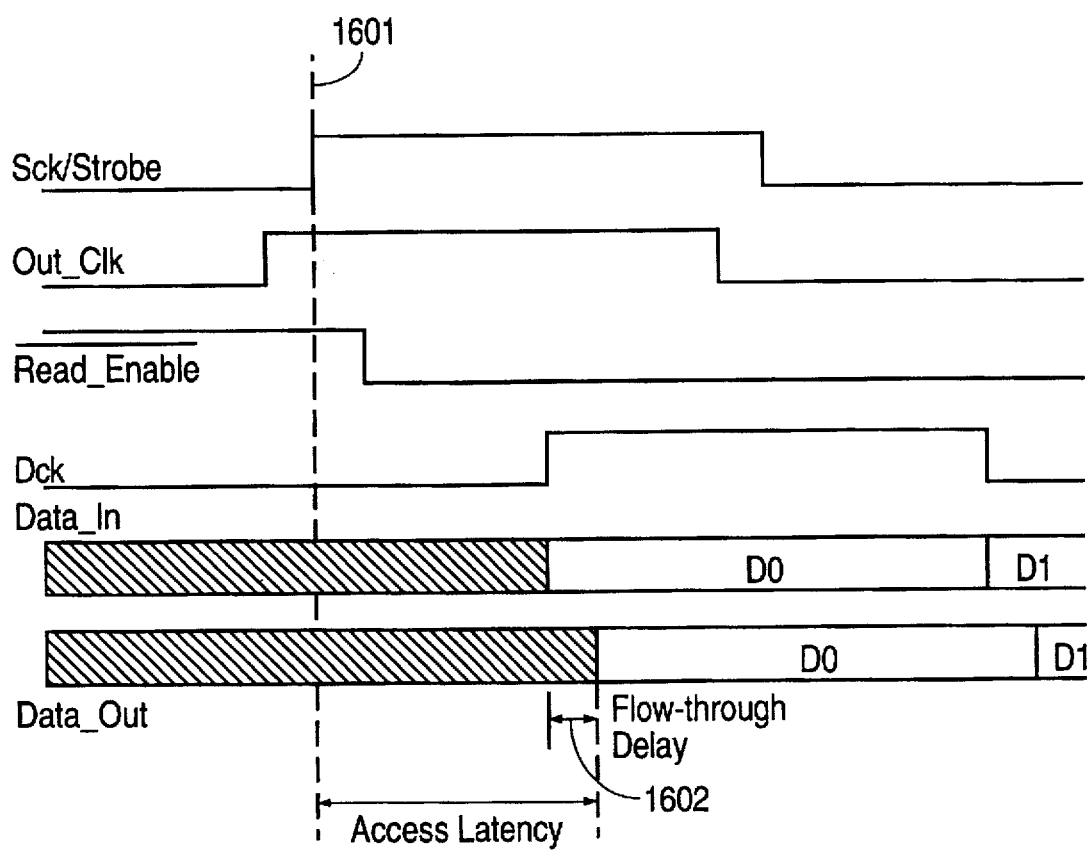
FIG. 16 is a waveform diagram illustrating timing waveforms of the resynchronization circuit of FIG. 12 when the device is operating asynchronously.

FIG. 16 is a waveform diagram illustrating the timing of resynchronization circuit 1200 during asynchronous operation. During an asynchronous operation, the mode select signal of flip-flop 1207 (FIG. 12) is set low, thereby disabling PLL circuit 1206. As a result, the Out_Clk signal and Advance_Enable signals are also disabled. Consequently, the output of AND gate 1324e (FIG. 13) is set low and flip-flop 1322 is disabled with its output Q bar set high. Thus, both inputs of AND gate 1324a are high, causing the Out_Sel0 signal to transition to a high state and turning on transistor 1309a of latch 1301.

On the input side, the low mode_select signal is transmitted through inverter 1350 to NOR gate 1351. As a result, flip-flop 1315 is disabled and its output Q bar is set to a high state. The low mode_select signal is also provided to AND gate 1316e, thereby causing a logic low signal at the output of AND gate 1316e. As a result, both inputs to AND gate 1316a are high. As a result, the In_Sel0 signal transitions to a high state and transistor 1307a of latch 1301 is turned on. Consequently, data value D0 of the Data_In signal is transmitted through latch 1301. A small flow through delay 1602 is associated with the transmission of the data value through latch 1301. Both the Out_Sel0 and In_Sel0 signals stay high as long as the mode_select signal from mode_select flip-flop 1207 is low.

Multiple-module and Multiple-array operations

The circuit-module architecture of the present invention is well suited for multiple array operations. Operations such as broadcast-write and interleaved burst allow data from different memory arrays in different modules to be accessed simultaneously, thereby increasing the performance of the memory device.

Figure 17:
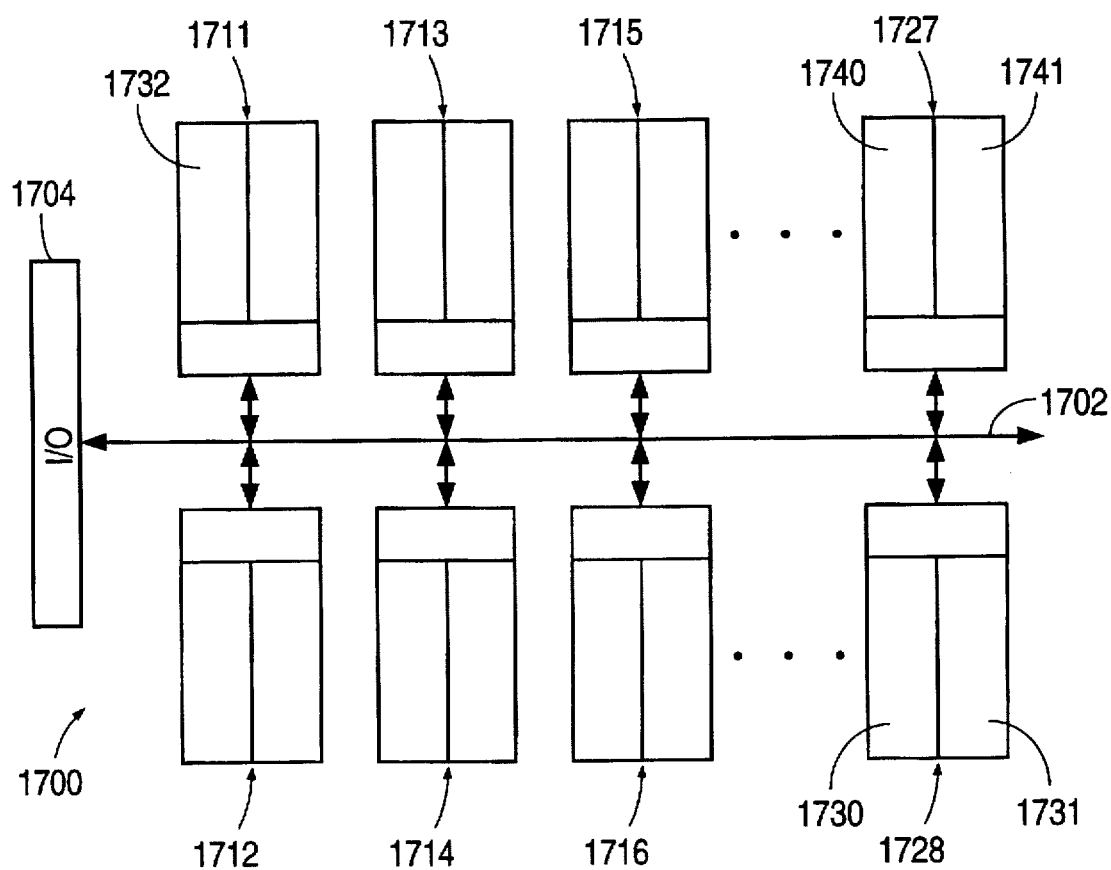
FIG. 17 is a block diagram of a memory device configured for broadcast-write operation.

FIG. 17 is a block diagram of memory device 1700 which is used to perform a broadcast-write operation. Memory device 1700 includes memory modules 1711-1728 which are connected in parallel to master I/O device 1704 through DASS bus 1702. Each of memory modules 1711-1728 has two memory arrays. Two memory array-select bits are provided in the access-control register of each memory module 1711-1728. These two bits are set or reset by a "Broadcast-write Select" command received on DASS bus 1702. Once an array-select bit is set, the associated array is selected for participating in the subsequent write operations. A selected array remains selected until its associated array-select bit is reset. One or both arrays in a module can be selected. Furthermore, one or more modules can be selected. A write operation writes a data stream to all selected arrays simultaneously.

In the embodiment illustrated in FIG. 17, memory array 1732 in module 1711 and memory arrays 1730 and 1731 in module 1728 are selected by programming the memory array-select bits in these modules. In other embodiments, other memory arrays and/or memory modules may be selected. After the desired arrays have been selected, a stream of write data is broadcast from I/O device 1704 to DASS bus 1702 and this data is simultaneously written into memory arrays 1730-1732.

In graphics applications, when the memory device 1700 is used as a display buffer, a fixed pattern can be simultaneously written into multiple display screen memory locations using a broadcast-write operation, thereby significantly increasing the graphics update bandwidth.

Another multiple-array operation is an interleaved burst operation, in which a read or write command causes data to be read from or written to different arrays in a time multiplexed data burst. Instead of bursting data in to or out of a single array, multiple arrays participate in a time-multiplexed manner. Each participating array latches in (or send out) a piece of data (i.e., one or more words) during a specified time period (i.e., one or more clock cycles) in a consecutive manner.

Figure 18:
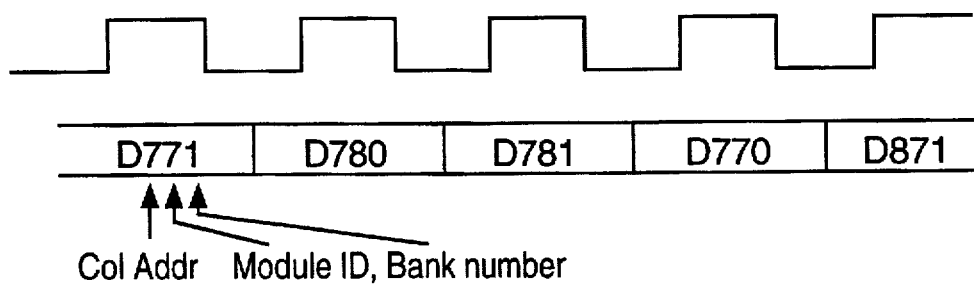
FIG. 18 is a waveform diagram illustrating sequencing of an interleaved access operation.

FIG. 18 is a waveform diagram illustrating the addressing of read (or write) operations during an interleaved burst operation. An interleave-enable bit in the access-control register of each memory module determines whether an interleaved burst operation will be performed. The interleave-enable bit of each memory module is programmed from a command transmitted on the DASS bus. In one embodiment, another three bits in each access-control register determines the total number of arrays which will participate in the interleaved operation. In such an embodiment, up to eight memory arrays can participate in an interleaved operation. In other embodiments, other numbers of memory arrays can participate in the interleaved operations.

The waveform of FIG. 18, which is referenced to the structure of memory device 1700 (FIG. 17), illustrates one such interleaving sequence. In this interleaving sequence, the interleave-enable bits in modules 1727 and 1728 are set. In addition, the access-control registers in modules 1727 and 1728 are programmed to indicate that four memory arrays will participate in the interleaved access. A read command is then addressed to column address 7, module 1727, array 1741 (D771). Data words are then sequentially read out of the following addresses: column address 7, module 1727, array 1741 (D771); column address 7, module 1728, array 1734 (D780); column address 7, module 1728, array 1731 (D781); and column address 7, module 1727, array 1740 (D770). The sequence continues until the interleaved-burst read command is terminated. Each participating array takes a turn, in a round robin fashion, to send a data word.

RAS and precharge operations are performed simultaneously in each memory array selected for an interleaved-burst operation. A RAS or precharge operation addressed to any of the selected memory arrays causes all of the selected arrays to simultaneously perform the RAS or precharge operation. This eliminates the need to issue multiple commands to multiple arrays to perform multiple RAS or precharge operations. Consequently, command overhead is saved.

In graphics applications, where rows of memory cells in adjacent arrays are mapped to consecutive horizontal lines in a display screen (See, e.g., U.S. Pat. No. 4,980,765 issued to Kudo et al), an interleaved-burst operation allows pixels in consecutive lines to be accessed in one data burst. In another embodiment, an interleaved-burst operation is used to perform graphical operations such as line draw and polygon draw, which require fast access to consecutive pixels in both the horizontal and vertical directions.

In addition to the single-command multiple-data operations described above, a memory device in accordance with the present invention provides multiple commands, one after another, to different arrays. For example, a RAS command to a first memory array can be followed by another RAS command to a second memory array without waiting for the RAS command in the first array to finish, which in turn can be followed by a precharge command to a third memory array, followed by a CAS read command to a fourth memory array. Therefore, multiple memory arrays can perform multiple operations simultaneously, thereby increasing the performance of the memory device.

Reduced Swing I/O Bus Structure and Protocol

In certain embodiments, the I/O bus 106 (FIG. 1) connects multiple memory devices (such as memory device 100) to form a memory system with a larger memory capacity and/or more functions. One or more master devices can be attached to the I/O Bus 106 to control the operations in the system. A master device can be a bus master in certain bus transactions and a slave in the other bus transactions.

Figure 19:
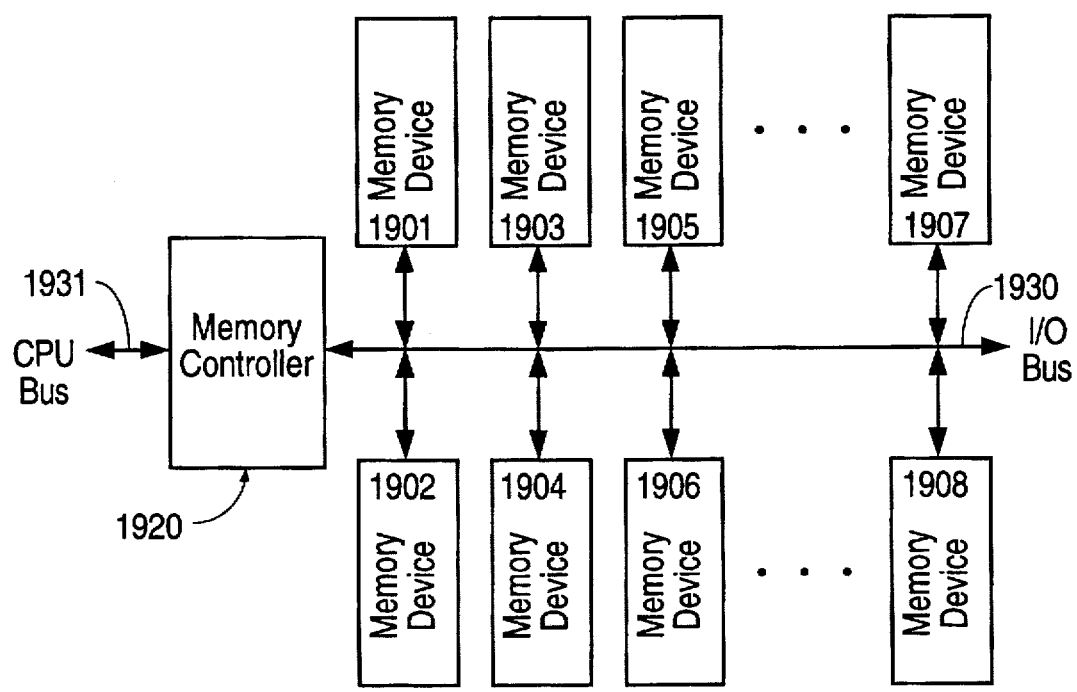
FIG. 19 is a block diagram of a memory system which includes a memory controller and multiple circuit-module memory devices connected in parallel through an I/O bus.

FIG. 19 is a block diagram of a memory system 1900 in accordance with one embodiment of the present invention. Memory system 1900 uses memory controller 1920 as a master device and multiple DASS memory devices 1901–1908 as slave devices. One port of memory controller 1920 is coupled to a CPU through CPU bus 1931. Another port of memory controller 1920 is coupled to memory devices 1901–1908 through an I/O bus 1930. In an alternate embodiment, memory controller 1920 resides in the I/O module of one of memory devices 1901–1908.

I/O bus 1930, which employs high-speed Reduced CMOS Swing (RCS) for signaling, includes: 16 bi-directional lines ADQ[15:0] for multiplexed address and data signals, 4 lines C[3:0] for command signals, 2 lines Dm[1:0] for write-mask signals, 1 line for a synchronization clock signal Mck, and 1 line for a clock enable signal Cke. The Cke and Mck signals are specific to I/O bus 1930. However, the remaining signals on I/O bus 1930 are extensions of the signals present on the DASS buses which exist within each of memory modules 1901–1908. Thus, the I/O modules in memory devices 1901–1908 (similar to I/O module 104 in memory device 100) are interface bridges between the DASS buses of memory devices 1901–1908 and I/O bus 1930. However, unlike the DASS buses, which use source synchronization for the timing of information transfer, I/O bus 1930 is fully synchronous with a single clock signal (Mck). The protocol used in I/O bus 1930 is a super-set of the protocol used in the DASS buses. However, the protocol used in the DASS buses does not include the protocol involving the Cke/ signal. The Cke signal is used for stopping and starting the clocks inside the memory devices 1901–1908. This allows devices of slower speed to be attached to I/O bus 1930 without lowering the system clock (Mck) frequency. Dedicated chip select (CS) lines to each of memory devices 1901–1908 are also included for system initialization. At power-up or after system reset, the communication addresses of the memory modules in memory devices 1901–1908 are reset to their default values. As a result, memory modules in different memory devices 1901–1908 may have the same communication address. The CS lines are used to program the memory modules within memory devices 1901–1908 so that the memory modules have different communication addresses in the overall memory system 1900.

Address mapping in a Multi-device Memory System

All devices attached to I/O bus 1930 are assigned unique communication addresses. This can be accomplished either by hardwired logic or by incorporating programmability in the ID assigning mechanism in the devices. In certain embodiments, a memory device can assume one or more communication addresses. Each memory module within memory devices 1901–1908 assumes a communication address. For memory operations, the communication address is contained in the memory address as a field. Each memory module spans a contiguous memory address space. However, the address space spanned by each memory device does not need to be contiguous since the communication address of each module can be individually programmed. By maintaining the same sets of commands and protocols in I/O bus 1930 and the DASS buses in memory devices 1901–1908, the ID registers of all modules in memory devices 1901–1908 are programmable through I/O bus 1930. Consequently, all modules in memory system 1900 can be dynamically assigned communication addresses to span different areas in the memory address space.

In one application the communication addresses of the modules are assigned such that memory system 1900 has a contiguous memory space. In another application, the dynamic address mapping capability of the present invention is used in computer systems operating on virtual memory addresses. In conventional memory devices which map to a fixed address space, the virtual address has to be translated to a physical address before a memory access can be carried out. This required translation increases system complexity and memory access latency. However, using the present memory system, the communication address of a memory module can be programmed to assume a virtual address. A memory access can then be carried out without performing an address translation. Managing such a memory system is straightforward because allocating and de-allocating memory pages is a matter of changing the communication addresses of one or more memory modules. Because the present memory system is capable of operating with virtual addresses and it can be referred to as a "Virtual Main Memory".

Fault Tolerant System

Memory system 1900 (FIG. 19) is highly tolerant to defects. Three levels of redundancy provide memory system 1900 with high fault tolerance. At the system level, each memory device 1901–1930 incorporates a disable register which when set, disables the device from participating in memory transactions on the I/O bus 1930. Redundant devices can be easily incorporated on I/O bus 1930 for repairing defective devices on the bus.

Within each memory device 1901–1908, redundant memory modules are incorporated in each device and each memory module includes an ID register which is programmable through commands on I/O bus 1930. This redundancy mechanism allows for the efficient repair of defective modules both locally in the memory device and globally in other devices attached to I/O bus 1930. That is, any of the redundant modules in any of the memory devices 1901–1908 can replace any defective memory module in any of the memory devices 1901–1908. As more memory devices are added to memory system 1900, the ratio of redundant modules to regular modules is maintained, but the ability to repair cluster defects increases. For example, in a memory system having four memory devices, with each memory device having one redundant module, a cluster defect involving four or less modules can be repaired without any degradation in performance. This is advantageous because cluster defects are the predominant cause of integrated system failure. Redundant memory modules of traditional redundancy schemes can only be used to replace memory modules within the same memory device (i.e., on the same chip).

Within each memory array, redundant rows and columns are used to repair defects inside the respective memory array as previously described in connection with FIGS. 5a and 5b.

I/O Bus Drivers, Receivers and Terminations

Electrically, the signals on I/O bus 1930 have a swing of approximately 2 volts centered around the middle of the supply voltage. The actual signal swing can be adjusted to optimize the operating frequency and minimize power dissipation. Two types of termination are used on I/O bus 1930 to suppress transmission line effects such as reflections and ringing. Details of the structure of the bus transceiver and termination are described below.

In order to operate I/O bus 1930 at high clock frequencies, small-swing signaling is employed. To maximize the noise immunity and data rate, and minimize the complexity of the bus transceiver circuit, a logic threshold equal to half of the supply voltage ($V_{dd}$) is used. This threshold voltage matches the threshold voltage of the rest of the on-chip CMOS logic. Consequently logic translation circuitry is eliminated. An active clamp or a passive clamp is used to limit the signal swing.

Figure 20A:
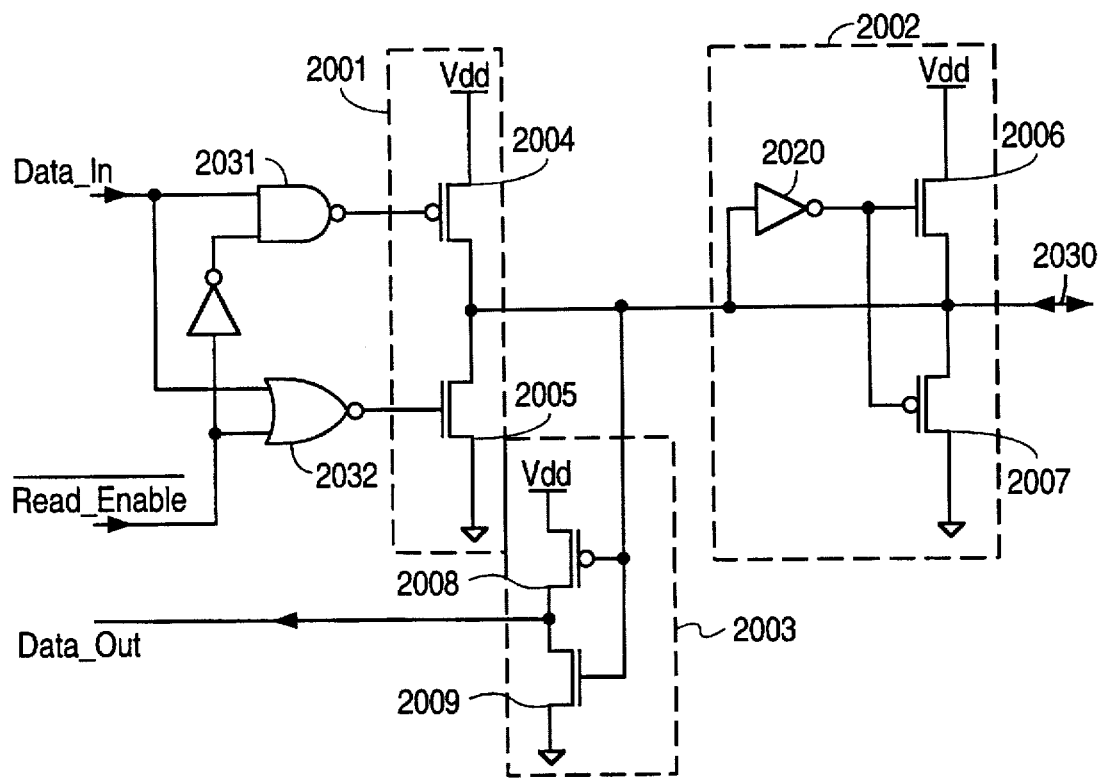
FIG. 20a is a schematic diagram of a reduced CMOS swing bus transceiver with active termination.
Figure 20B:
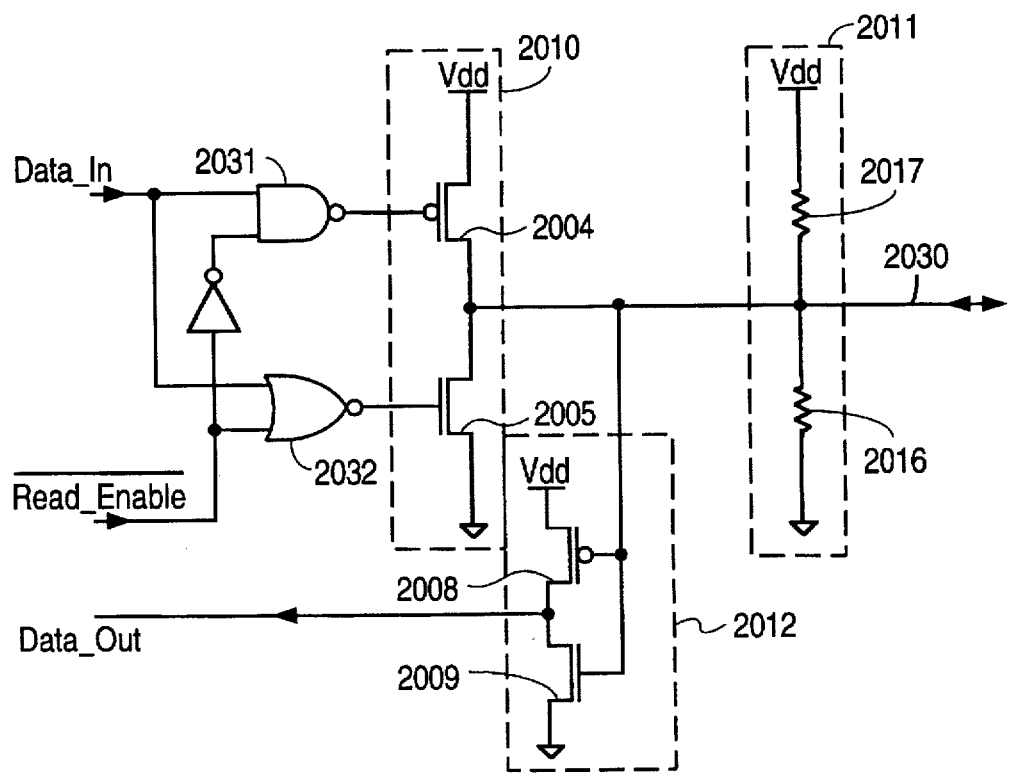
FIG. 20b is a schematic diagram of a reduced CMOS swing bus transceiver with resistive termination.

FIGS. 20a and 20b are schematic diagrams of active clamp 2002 and passive clamp 2011, respectively. Clamps 2002 and 2011 limit the swing on a bus line 2030 of I/O bus 1930. P-channel transistor 2004 and n-channel transistor 2005 form push-pull driver 2001 with equal sourcing and sinking capability. This balanced drive capability makes the signal transition of bus line 2030 symmetrical, thereby eliminating signal skew and maximizing the operating bandwidth of bus line 2030. The balance in pull-up and pull-down also yields a circuit with maximum supply noise rejection because transistors 2004 and 2005 spend equal amounts of time in the saturation region during signal transition. In fact, when properly selected, transistors 2004 and 2005 remain in the saturation region at all times, giving bus line 2030 maximum immunity to supply ($V_{dd}$) and ground (GND) noise.

The gates of transistors 2004 and 2005 are driven by the outputs of NAND gate 2031 and NOR gate 2032, respectively. Logic gates 2031 and 2032 receive a Data_In signal and a Read_Enable signal as illustrated. The Read_Enable signal, when de-asserted high, turns off transistors 2004 and 2005, thereby tri-stating the bus driver.

Receiver 2003 is a CMOS inverter which includes transistors 2008 and 2009. Receiver 2003 has equal pull-up and pull-down capability. The input of receiver 2003 is coupled to bus line 2030 and the output of receiver 2003 provides a Data_Out signal Active clamp circuit 2002 (FIG. 20a) includes a CMOS inverter 2020 and clamp transistors 2006 and 2007 connected as source followers. The sizes of transistors 2006 and 2007 control the voltage swing on bus line 2030. In one embodiment, the sizes of transistors 2006 and 2007 are twice the sizes of transistors 2005 and 2004, respectively. When bus line 2030 is driven from high to low by bus driver 2001, and the voltage on bus line 2030 has not reached $V_{dd}/2$ volts, the output of inverter 2020 is low, transistor 2007 is on and transistor 2006 is off. When voltage on bus line 2030 is pulled below $V_{dd}/2$ volt, output of inverter 2020 goes high, turning transistor 2007 off and turning transistor 2006 on, thereby taking away the sinking current available to bus line 2030. As the voltage on bus line 2030 continues to go down, transistor 2006 is turned on stronger, thereby taking more sinking current from bus line 2030. When the voltage on bus line 2030 is approximately 1.5 VTP above ground, the current through transistor 2006 equals the current through transistor 2005, and the voltage on bus line 2030 becomes steady. VTP is the turn on threshold voltage of transistor 2007 (typically 1 volt).

Similarly, a low to high transition of bus line 2030 causes transistor 2006 to turn off and transistor 2007 to turn on, with the voltage on bus line 2030 clamped at approximately 1.5 VTN below $V_{dd}$, where VTN is the turn on threshold voltage of transistor 2006 (typically 1 volt).

Passive clamp 2011 (FIG. 20b) is a resistor divider. Equal-value resistors 2016 and 2017 are connected between $V_{dd}$, bus line 2030 and ground. Passive clamp 2011 can also be a Thevenin equivalent of a resistor divider. For example, a resistor having half the resistance of resistor 2016 can be connected to a supply voltage equal to half of $V_{dd}$. Passive clamp 2011 takes the advantage of the finite output resistance of the driver transistors 2004 and 2005. When bus line 2030 is driven from low to high, transistor 2005 is turned off and transistor 2004 is turned on. Initially, transistor 2004 and resistor 2017 source more current than resistor 2016 can sink, thereby pulling the voltage on bus line 2030 high. As the voltage on bus line 2030 continues to rise, the sourcing capability of both transistor 2014 and resistor 2017 decrease and the sinking capability of resistor 2016 increases. This continues until the total source current is equal to the sink current. The voltage on bus line 2030 then remains constant until the Data_In signal changes. Similarly, when bus line 2030 is driven from high to low, the voltage on bus line 2030 is clamped when the source current in resistor 2017 equals the total sink current in transistor 2005 and resistor 2016. The voltage swing can be adjusted by varying the size of driver transistors 2005 and 2004 or the value of resistors 2016 and 2017.

When using either active clamp 2002 or passive clamp 2011, only one clamp circuit per bus line is required. The clamp circuit can be integrated in the master device, in one of the slave devices or in a separate device. Also, in both clamping circuits, bus line 2030 is clamped or terminated with a relatively small value resistance. In active clamp 2002, transistors 2006 and 2007 have relatively low output resistances since they are connected as source followers. In passive clamp 2011, the Thevenin equivalent of the resistor divider facilitates the termination. The termination in both cases suppresses reflection and ringing which can degrade the signal-to-noise ratio and limit the operating frequency on bus line 2030.

This disclosure is illustrative and not limiting; further modifications and variations will be apparent to those skilled in the art in light of this disclosure and are intended to fall within the appended claims.

What is claimed is:

1. A passive termination circuit for controlling the termination voltage of a bus comprising:

a first terminal for receiving a first supply voltage;

a second terminal for receiving a second supply voltage;

a bus driver circuit having a first transistor of a first conductivity type coupled between said first terminal and said bus and a second transistor of a second conductivity type opposite said first conductivity type coupled between said second terminal and said bus;

a first clamping resistor coupled between said bus and said second terminal; and a second clamping resistor coupled between said bus and said first terminal, wherein the termination voltage of the bus is equal to one half of the difference between the first and second supply voltages, and wherein said bus is coupled to CMOS circuitry having a threshold voltage equal to one half of the difference between said first and second supply voltages.

2. The termination circuit of claim 1, wherein said first conductivity type is p-type and said second conductivity type is n-type.

3. The termination circuit of claim 1, wherein said first clamping resistor and said second clamping resistor have the same resistance.

4. The termination circuit of claim 1, further comprising a bus receiver having a third transistor with a gate coupled to said bus, a source coupled to said first terminal and a drain coupled to an output line and a fourth transistor with a gate coupled to said bus, a source coupled to said output line and a drain coupled to said second terminal.

5. The termination circuit of claim 4, wherein the bus receiver comprises a CMOS inverter.

6. A passive termination circuit for controlling the termination voltage of a bus comprising:

a first terminal for receiving a first supply voltage;

a second terminal for receiving a second supply voltage;

a bus driver circuit having a first transistor of a first conductivity type coupled between said first terminal and said bus and a second transistor of a second conductivity type opposite said first conductivity type coupled between said second terminal and said bus;

a first clamping resistor coupled between said bus and said second terminal;

a second clamping resistor coupled between said bus and said first terminal, wherein the termination voltage of the bus is equal to one half of the difference between the first and second supply voltages;

a bus receiver having a third transistor with a gate coupled to said bus, a source coupled to said first terminal and a drain coupled to an output line and a fourth transistor with a gate coupled to said bus, a source coupled to said output line and a drain coupled to said second terminal, wherein the termination voltage of the bus is equal to the threshold voltage of the bus receiver.

7. The termination circuit of claim 6, wherein said third transistor is a p-channel field effect transistor and said fourth transistor is an n-channel field effect transistor.

8. A method of terminating a bus which transitions between a first voltage and a second voltage, said method comprising the steps of:

providing a first supply voltage to a first voltage supply;

providing a second supply voltage to a second voltage supply;

sourcing current in parallel from a first voltage supply through a first transistor and a first resistor, and sinking current to a second voltage supply through a second resistor as said bus transitions from said second voltage to said first voltage; and sourcing current from said first voltage supply through said first resistor, and sinking current to said second voltage supply in parallel through a second transistor and said second resistor as said bus transitions from said first voltage to said second voltage, wherein the termination voltage of the bus is equal to one half of the difference between the first and second supply voltages, said bus being coupled to CMOS circuitry having a threshold voltage equal to one half of the difference between the first and second supply voltages.

9. The method of claim 8, wherein the first voltage is greater than the termination voltage of the bus and less than the first supply voltage, and wherein the second voltage is greater than the second supply voltage and less than the termination voltage of the bus.

10. An active termination circuit for a bus comprising:

a first terminal for receiving a first supply voltage;

a second terminal for receiving a second supply voltage;

a bus driver circuit having a first transistor of a first conductivity type coupled between said first terminal and said bus and a second transistor of a second conductivity type opposite said first conductivity type coupled between said second terminal and said bus;

a third transistor of said first conductivity type coupled between said bus and said second terminal;

a fourth transistor of said second conductivity type coupled between said bus and said first terminal; and an inverter having an input coupled to said bus and an output coupled to the gate of said third transistor and to the gate of said fourth transistor.

11. The active termination circuit of claim 10, wherein said third transistor has approximately the same drive capability as said fourth transistor, said first transistor has approximately the same drive capability as said second transistor and said third and fourth transistors are approximately twice the size of said first and second transistors.

12. The termination circuit of claim 10, further comprising a bus receiver having a fifth transistor of said first conductivity type with a gate coupled to said bus, a source coupled to said first terminal and a drain coupled to an output line and a sixth transistor of said second conductivity type with a gate coupled to said bus, a source coupled to said output line and a drain coupled to said second terminal.

13. The termination circuit of claim 10, wherein the inverter is a CMOS inverter.

14. The termination circuit of claim 10, wherein the termination voltage of the bus is equal to one half of the difference between the first and second supply voltages.

15. The termination circuit of claim 10, wherein said bus is coupled to CMOS circuitry having a threshold voltage equal to one half of the difference between said first and second supply voltages.

16. A method of terminating a bus which transitions between a first voltage and a second voltage, said method comprising the steps of:

providing a first supply voltage to a first voltage supply;

providing a second supply voltage to a second voltage supply;

sourcing current from said first voltage supply to said bus through a first transistor of a first conductivity type and sinking current from said bus to said second voltage supply through a second transistor of said first conductivity type as said bus transitions from said second voltage to said first voltage; and sourcing current from said first voltage supply to said bus through a third transistor of a second conductivity type opposite said first conductivity type and sinking current from said bus to said second voltage supply through a fourth transistor of said second conductivity type as said bus transitions from said first voltage to said second voltage.

17. The method of claim 16, further comprising the step of operating said second and third transistors in response to a voltage on said bus.

18. The method of claim 16, wherein the termination voltage of the bus is equal to one half of the difference between the first and second supply voltages.

19. The method of claim 16, further comprising the step of coupling said bus to CMOS circuitry having a threshold voltage equal to one half of the difference between the first and second supply voltages.

20. The method of claim 16, wherein the first voltage is greater than the termination voltage of the bus and less than the first supply voltage, and wherein the second voltage is greater than the second supply voltage and less than the termination voltage of the bus.

* * * * *

UNITED STATES PATENT AND TRADEMARK OFFICE
CERTIFICATE OF CORRECTION

PATENT NO.    : 5,729,152
ISSUE DATE    : March 17, 1998
INVENTOR(S)   : Leung, Wingyu; Lee, Winston; Hsu, Fu-Chieh It is certified that error appears in the above-identified patent and that said Letters Patent is hereby corrected as shown below:

Col. 15, line 25, delete "99i" and insert --991--.

Col. 24, lines 44, 46, 47, 48, 49, delete "7" and insert --7--.

Col. 24, lines 44, 46, and 49, delete "1727" and insert --1727--.

Col. 24, lines 45, 47, delete "1741" and insert --1741--.

Col. 24, lines 46, 47, delete "1728" and insert --1728--.

Col 24, line 46, delete "1734" and insert --1730--.

Col. 24, line 46, delete "1731" and insert --1731--.

Col. 24, line 47, delete "1740" and inser --1740--.

Signed and Sealed this

Third Day of August, 1999

Q. TODD DICKINSON

*Attest:*

*Attesting Officer*          *Acting Commissioner of Patents and Trademarks*